United States Patent
Al Shakarchi et al.

(10) Patent No.: US 11,437,817 B2
(45) Date of Patent: Sep. 6, 2022

(54) METHOD AND DEVICE FOR DRIVING AN ELECTRICITY PRODUCTION ASSEMBLY, AND ASSOCIATED PRODUCTION ASSEMBLY

(71) Applicant: COMMISSARIAT À L'ENERGIE ATOMIQUE ET AUX ENERGIES ALTERNATIVES, Paris (FR)

(72) Inventors: Franck Al Shakarchi, Grenoble (FR); Franck Bourry, Grenoble (FR); Audrey Wantier, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 17/123,718

(22) Filed: Dec. 16, 2020

(65) Prior Publication Data
US 2021/0184464 A1  Jun. 17, 2021

(30) Foreign Application Priority Data
Dec. 16, 2019 (FR) ........................ 1914499

(51) Int. Cl.
  *H02J 3/24*  (2006.01)
  *G05B 13/04*  (2006.01)
  *H02J 13/00*  (2006.01)

(52) U.S. Cl.
  CPC ............. *H02J 3/24* (2013.01); *G05B 13/041* (2013.01); *H02J 13/00002* (2020.01); *H02J 2203/20* (2020.01); *H02J 2300/20* (2020.01)

(58) Field of Classification Search
  CPC .... H02J 3/24; H02J 13/00002; H02J 2203/20; H02J 2300/20; H02J 3/32; H02J 3/381; G05B 13/041
  (Continued)

(56) References Cited

U.S. PATENT DOCUMENTS

| | | | |
|---|---|---|---|
| 2016/0154397 A1* | 6/2016 | Guelbenzu Michelena | ................ H02J 3/383 700/295 |
| 2016/0218514 A1* | 7/2016 | Takeda | ..................... H02J 3/383 |
| 2016/0276859 A1* | 9/2016 | Kudo | ...................... H02J 3/381 |

FOREIGN PATENT DOCUMENTS

| CN | 101841163 A | 9/2010 |
|---|---|---|
| CN | 103066620 A | 4/2013 |

(Continued)

OTHER PUBLICATIONS

Search Report as issued in French Patent Application No. 1914499, dated Jul. 8, 2020.

*Primary Examiner* — Jigneshkumar C Patel
(74) *Attorney, Agent, or Firm* — Pillsbury Winthrop Shaw Pitman LLP

(57) ABSTRACT

A method for driving an electricity production assembly includes an electricity production system, that generates an output power, as well as an electricity storage system. The production assembly is driven, at each time-step, in such a way as to deliver a total power that is less than a maximum admissible power. The maximum admissible power is determined in such a way that the production assembly can, starting from this power, and taking account of a stored energy in the storage system at the considered time-step, progressively reach, with a moderate slope, a minimum anticipated power, which is representative of the worst downward variation expected for the output power in case of degradations in meteorological conditions.

10 Claims, 10 Drawing Sheets

(58) Field of Classification Search
USPC .......................................................... 700/287
See application file for complete search history.

(56) References Cited

FOREIGN PATENT DOCUMENTS

| EP | 3 026 774 A1 | 6/2016 |
|----|--------------|--------|
| WO | WO 2011/112255 A2 | 9/2011 |
| WO | WO 2011/112350 A2 | 9/2011 |
| WO | WO 2017/062906 A1 | 4/2017 |

* cited by examiner

METHOD AND DEVICE FOR DRIVING AN ELECTRICITY PRODUCTION ASSEMBLY, AND ASSOCIATED PRODUCTION ASSEMBLY

CROSS-REFERENCE TO RELATED APPLICATIONS

This application claims priority to French Patent Application No. 1914499, filed Dec. 16, 2019, the entire content of which is incorporated herein by reference in its entirety.

TECHNICAL FIELD

The invention relates to a method and a device for driving an electricity production assembly wherein an electrical output power depends on surrounding meteorological conditions, and can therefore fluctuate in a way that is hardly predictable.

TECHNOLOGICAL BACKGROUND

Electricity production systems based on renewable energies, of the photovoltaic or wind turbine type, are increasingly widespread. But the electrical power produced by such systems van vary substantially and is hardly predictable under the effect of the variations in the surrounding meteorological conditions.

By way of example, when a cloud comes between the sun and an array of photovoltaic panels, the electrical power produced by this installation can drop very quickly, with a rate of change of 50% per minute, even 80% per minute. Managing such a rate of change is particularly problematic for an electricity distribution network connected to this array of photovoltaic panels.

It is for this reason that most of the organisations that manage electricity distribution networks impose on the production systems connected to the network to provide an electrical power of which the rate of change remains less than a given limit, for example less than a few percent per minute (typically 5 or 10% per minute, at most).

To attenuate the variations in the electrical power produced, caused by the variations in meteorological conditions, it is known to combine a system for storing electrical energy with the production system. The storage system can for example be carried out in the form of a set of electric batteries, or in the form of a hydroelectric system that makes it possible to store energy by pumping water to a reservoir located at a height.

In case of a sudden drop in the electrical power produced by the production system, the storage system then delivers an additional electrical power that is added to the output power, which makes it possible to attenuate the variations (downwards) of the total electrical power delivered to the distribution network.

Likewise, in case of a sudden increase in the output power, a portion of this power is absorbed by the storage system, in order to limit the increase in the total electrical power delivered to the distribution network.

Document CN101841163, for example, describes a method for driving an electricity production assembly comprising an assembly of wind turbines, an assembly of photovoltaic panels and an assembly of electric batteries. This production assembly supplies a distribution network. When a detection device detects that the total electrical power, produced by the wind turbines and photovoltaic panels, is less than a power fluctuation range allowed by the distribution network, then, the assembly of batteries is driven in such a way as to deliver electricity. Inversely, when it is detected that the total power produced is greater than this fluctuation range, the assembly of batteries is driven in such a way as to store energy.

This method of driving makes it possible to partially overcome a one-off drop in the total power produced, due for example to the passing of a cloud above the photovoltaic panels.

But in case of a prolonged drop in the output power, for example if the sky becomes sustainably covered with clouds, the electric batteries will end up being completely emptied and the electrical power delivered to the distribution network finally risks suddenly falling.

To overcome this problem, a solution could consist in substantially increasing the storage capacities of the assembly of electric batteries. But such a solution is expensive and has a substantial environmental (ecological) impact.

In this context, there is therefore a need for a method or a device for driving that makes it possible to drive an electricity production assembly, by limiting the fluctuations in the total electrical power delivered by this assembly even if the storage system of this production assembly has a limited storage capacity.

SUMMARY

In order to resolve at least partially the problem mentioned hereinabove, a method is proposed for driving an electricity production assembly that delivers a delivered power to an electricity distribution network, the electricity production assembly comprising at least:
 an system for producing electricity that generates an output power that depends on surrounding meteorological conditions, for which it is estimated that the output power is at least equal to a minimum anticipated power even in case of a downward fluctuation due to variations in metrological conditions, and
 a system for storing electrical energy, wherein an available, stored energy is stored,
the method comprising the following steps, executed again at each time-step by a device for driving that comprises at least a processor and a memory:
 determining a maximum admissible power for the next time-step,
 determining a target power for the production assembly, the target power being determined in such a way as to be less than the maximum admissible power,
 driving the production assembly in such a way that the delivered power at the next time-step is equal to the target power.

The step of determining the maximum admissible power comprises a step of validating, during which it is tested whether the maximum admissible power satisfies the following criterion:
 if the production assembly delivers said maximum admissible power at the next time-step, and if the output power, generated by the production system, becomes equal to said minimum anticipated power starting from the next time-step,
 then, in view of the stored energy in the storage system at the time-step considered, the production assembly can subsequently deliver a delivered power that, over time, progressively reaches said minimum anticipated power, while still varying with a slope that remains between a minimum authorised slope and a maximum authorised slope.

The step of validating comprises a determination by numerical simulation of the (total) power that would subsequently be delivered, over time, by the production assembly, said simulation comprising a determination of a storage power delivered by (or stored in) the storage system over time, the storage power being determined based on an electrical or energy behaviour model of the storage system.

It is understood that, if the delivered power is driven to a very high value at the next step, although the stored energy is reduced, it may occur, in case of a degradation in the meteorological conditions, that the power delivered subsequently drops suddenly, with an excessively high rate of change, without it being possible to moderate this drop with an additional supply from the storage system.

That is why it is verified here, during the step of validating, that it will be possible, in view of the stored energy in the storage system, to reach, with a moderate slope, a sort of safety curve that corresponds to the minimum anticipated power, in the case where the meteorological conditions were to be degraded suddenly and sustainably.

The maximum admissible power can for example be determined in such a way as to be the largest power, which, if it were delivered at the next step, would make it possible to satisfy this sort of safety criterion.

Driving the production assembly at a power that, at each time-step, is less than the maximum admissible power, therefore makes it possible to anticipate a degradation, considered as the worst that can happen, in the meteorological conditions. This therefore makes it possible, in all circumstances, or practically in all circumstances, to deliver to the distribution network a delivered power of which the rate of change remains less than a maximum rate of change allowed by the network, i.e. of which the slope remains between the minimum and maximum authorised slopes mentioned hereinabove. These minimum and maximum authorised slopes can for example be equal respectively to −10% of an average power, per minute, and +10% of this average power, per minute).

In case of a sudden degradation in the meteorological conditions, the storage system (for example a set of electric batteries) delivers a storage power, which allows for a progressive decrease in the total power delivered by the production assembly. However the storage power supplied by such a storage system generally depends on one or more state parameters of this system, in particular of the energy stored in the storage system: the storage power, which can actually be delivered, generally depends on the energy stored in the storage system, $E_{stock}$; moreover, the way in which $E_{stock}$ decreases during a discharge also depends on the storage power delivered, more or less strong (the losses in the storage system often being according to the storage power delivered, and in a way that is not always linear).

Carrying out the step of validating in question by numerical simulation, in particular by taking account of the electrical or energy behaviour model of the storage system, therefore allows for a particularly realistic determination of the total power that would effectively be delivered by the production assembly, in case of a sudden degradation in the meteorological conditions, which allows for a more reliable determining of the maximum admissible power at the next time-step, and therefore a driving that is both safer and more effective of the production assembly in terms of delivered power.

In addition to the characteristics presented hereinabove, the method that has just been presented can comprise one or more optional and non-limiting characteristics among the following, taken individually or in any technically permissible combination:

the method further comprises a step of determining an interval of delivered powers, that can be considered for the production assembly at the next time-step, said interval extending from a minimum acceptable power to a maximum acceptable power, the slope between the minimum acceptable power, at the next time-step, and the delivered power, actually generated at the considered time-step, being equal to said minimum authorised slope, the slope between the maximum acceptable power, at the next time-step, and the delivered power, actually generated at the considered time-step, being equal to said maximum authorised slope;

the maximum admissible power is determined by seeking, in said interval, the largest electrical power that satisfies said criterion;

the method further comprises an acquisition of a required power, to be supplied to the electricity distribution network, and wherein the target power is determined in such a way as to be as close as possible to the required power, while still being less than or equal to said maximum admissible power;

it is estimated that the output power by the production system is at most equal to a maximum anticipated power, even in case of an upward fluctuation due to variations in metrological conditions, an electrical energy, that can still be received and stored in the storage system in view of the stored energy already stored in the storage system and in view of its total storage capacity, is represented by an energy storage margin, and the method further comprises a step of determining a minimum admissible power, during which it is tested whether the minimum admissible power satisfies the following additional criterion:

if the production assembly delivers said minimum admissible power at the next time-step, and if the output power by the production system becomes equal to said maximum anticipated power starting from the next time-step, then, taking account of the storage margin of the storage system at the considered time-step, the production assembly can subsequently deliver a delivered power that, over time, progressively reaches said maximum anticipated power, while still varying with a slope that remains between the minimum authorised slope and the maximum authorised slope;

the target power is determined in such a way as to be higher than said minimum admissible power;

the minimum admissible power is determined by seeking, in said interval of delivered powers that can be considered for the production assembly at the next time-step, the smallest electrical power that satisfies said additional criterion;

during the step of validating, said numerical simulation is carried out by taking account of a maximum discharge power that can be supplied by the storage system during a discharge, the maximum discharge power being determined by taking account of the energy stored in the storage system, based on an operating model of the storage system;

said simulation can be carried out by also taking account of a maximum charge power that can be accepted by the storage system during a charge, the maximum charge power being determined by taking account of the energy stored in the storage system, based on the operating model in question;

during the method, the minimum anticipated power is determined as follows:

the minimum anticipated power is equal, at the considered time-step, to the output power, actually generated by the production system at the considered time-step, the minimum anticipated power then decreases linearly over time with a slope equal to a maximum downward variation slope, expected, on the average, for the production system, in case of a sudden fluctuation in the meteorological conditions, then, as soon as the minimum anticipated power reaches a low average power anticipation, the minimum anticipated power is equal to said low average power anticipation, the low average power anticipation being representative of the smallest expected output power, for average meteorological conditions that are the least favourable in terms of production;

the method comprises a determining of a safety curve, the safety curve being constituted, in a simulation plane of which the X-axis is time and of which the Y-axis is an electrical power, by the portion of the curve representative of the minimum anticipated power for which the slope is, at each instant, between the minimum authorised slope and the maximum authorised slope;

the method comprises a determining of a simulation path, the simulation path being the path that, in the simulation plane:

connects a point of departure, of which the coordinates are the next time-step and the maximum admissible power, to said safety curve, has a slope between the minimum authorised slope and the maximum authorised slope, and which, in the simulation plane, has the shortest length in view of the two preceding constraints;

said criterion is tested by carrying out a numerical simulation of the change in the power delivered by the electricity production assembly, during which it is tested whether the production assembly can reach said safety curve by following said simulation path, in view of the stored energy, present in the storage system at the considered time-step;

the production system can be driven, the output power able to be adjusted, for given metrological conditions, between a power modulated downwards and a power modulated upwards;

during the step of driving the production assembly, the production system is driven in such a way that the output power has the highest possible value, compatible with the fact that the power delivered by the production assembly has to reach said target power at the next time-step;

during the step of validating, said criterion is tested by taking account of the modulation possibilities of the output power, generated by the production system.

Another aspect of the invention relates to a device for driving for an electricity production assembly, the electricity production assembly delivering a delivered power to an electricity distribution network, the electricity production assembly comprising at least:
an electricity production system that generates an output power that depends on the surrounding meteorological conditions, for which it is estimated that the output power is at least equal to a minimum anticipated power even in case of a downward fluctuation due to variations in metrological conditions, and a system for storing electrical energy, wherein a stored energy, available, is stored, the device for driving that comprises at least one processor, a memory, and a communication module with the production and storage systems, the driving device being programmed to drive the electricity production assembly by executing the following steps, executed again at each time-step:

determining a maximum admissible power for the next time-step, this step comprising the step of validating described hereinabove, determining a target power for the production assembly, the target power being determined in such a way as to be less than the maximum admissible power, driving the production assembly in such a way that the delivered power at the next time-step is equal to the target power.

The different optional characteristics, presented hereinabove in terms of a method, can also be applied to the device that has just been described.

The invention also relates to an electricity production assembly, such as described hereinabove, further provided with a device for driving described hereinabove.

The invention and its different applications will be understood better when reading the following description and when examining the accompanying figures.

BRIEF DESCRIPTION OF THE FIGURES

The figures are shown for the purposes of information and in no way limit the invention.

DETAILED DESCRIPTION

Figure 1:
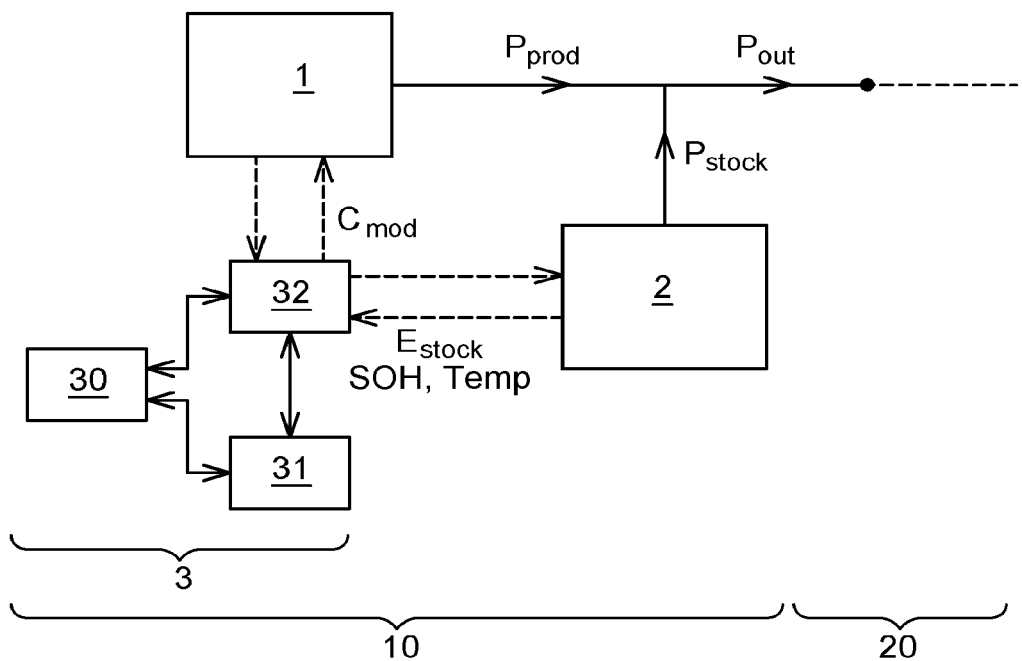
FIG. 1 diagrammatically shows an electricity production assembly.

FIG. 1 diagrammatically shows an electricity production assembly 10 comprising:
- a system for producing electricity 1 that generates an output power $P_{prod}$ that depends on the surrounding meteorological conditions (any cloud cover, speed of the wind, etc.), and
- a system for storing 2 electrical energy.

The production system 1 here comprises one or several arrays of photovoltaic panels. It can also include an assembly of wind turbines, and/or a solar thermal power plant. It can also include installations that consume electrical energy (it can therefore be considered that the output power $P_{prod}$ is, at times, negative).

Here, the production system 1 can be driven, and, at a given instant, for given fixed meteorological conditions, the output power $P_{prod}$ can be adjusted (or, in other terms, controlled) between a power modulated downwards, $P_{prod,L}$ and a power modulated upwards $P_{prod,H}$.

The output power $P_{prod}$ can for example be equal to a base power $P_{prob,b}$, multiplied by a modulation coefficient $C_{mod}$ that can be adjusted (controllable). The base power is the output power in the absence of modulation, and the modulation coefficient can be adjusted between a low modulation coefficient $C_{mod,L}$, less than 1, and a high modulation coefficient $C_{mod,H}$, greater than 1.

Here, the output power $P_{prod}$ can be modulated upwards because the production system is configured to, in an established operating regime, for example in a case where the meteorological conditions have been stable for a long time (for more than an hour for example), generate a power that is slightly less than the maximum power that the production system 1 could produce in these conditions. In other terms, the production system 1 is configured to, in an established operating regime, to operate in a regime of slight under-production, by producing a power equal for example to 90% of the maximum power that it can produce (in other terms, the base power $P_{prod,b}$ is then 90% of this maximum power). The type of operation (as a slight under-regime) is interesting because it makes it possible to have a modulation margin upwards (making it possible in particular to partially offset a sudden drop due to a degradation in the meteorological conditions).

Note however that, alternatively, the production system could generate an electrical power that is not modulable (the electrical power then depending only on the surrounding meteorological conditions).

Figure 2:
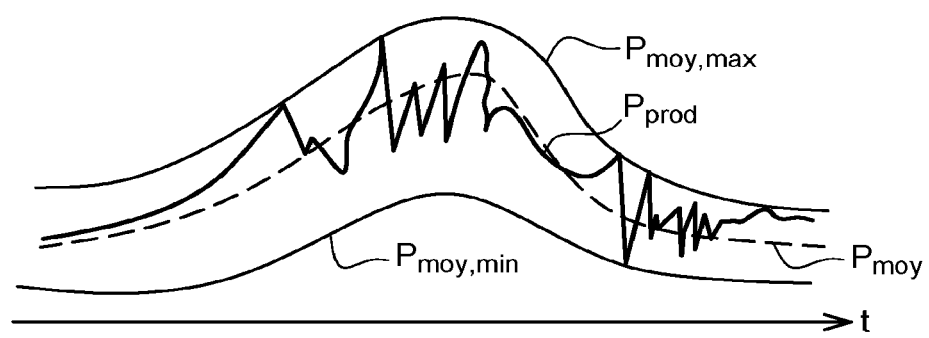
FIG. 2 diagrammatically shows an example of a change in an output power by a production system of the production assembly of FIG. 1.

As already indicated, the output power $P_{prod}$ can vary substantially following variations in the meteorological conditions. FIG. 2 diagrammatically shows, by way of example, variations in the output power $P_{prod}$, over time t, for a duration of about one day, and in the case where the output power is not modulated (therefore in a case where $P_{prod}=P_{prod,b}$, the modulation coefficient $C_{mod}$ being equal to 1).

As can be seen in this figure, the output power $P_{prod}$ fluctuates around an average power $P_{moy}$, which varies progressively, smoothly, during the day (due to the fact that the sun rises in the sky then descends again during the latter, with this average power reaching a maximum when the sun is at the zenith). Rapid fluctuations, due to temporary passes of clouds above the solar panels, are superimposed on this progressive average variation.

In this figure, a low average power anticipation $P_{moy,min}$ was also shown. This low anticipation corresponds to the smallest expected output power, for the production system 1, for average meteorological conditions, the least favourable possible in terms of production. These meteorological conditions correspond here to a situation without rapid fluctuations in the meteorological conditions (i.e. a situation wherein the variations in sunshine, for example, occur over a typical duration of about half a day, and are of about a minute or about ten minutes). These conditions correspond for example to a sky remaining heavily loaded with clouds, uniformly, all throughout the day.

FIG. 2 also shows a high anticipation of average power $P_{moy,max}$. This high anticipation corresponds to the largest expected output power, for the production system 1, for average meteorological conditions, the most favourable possible in terms of production. These meteorological conditions correspond here too to a situation without rapid fluctuations in the meteorological conditions. These conditions correspond for example to dry air and a sky that is uniformly clear all throughout the day.

The high and low anticipations of average power can be determined using a history of measurements of the output power $P_{prod}$, for example by a statistical processing of these measurements (such as a smoothing then an average between daily data). They can also be determined based on a theoretical model, taking account of the average meteorological conditions on the location of the production system 1.

The measurements, or the theoretical model in question, also make it possible to determine a maximum downward variation slope, $S_{fluct,min}$, expected, on the average, for the production system, in case of a sudden (and unfavourable) fluctuation in the meteorological conditions, for example if a cloud suddenly came between the sun and the photovoltaic panels. In practice, this anticipation of the maximum downward variation slope can for example correspond to a drop in power of 80% per minute.

The fluctuations in the output power $P_{prod}$, due to variations in meteorological conditions, are also characterised by a maximum upward variation slope, $S_{fluct,max}$, expected, on the average, for the production system, in case of a sudden (and favourable) fluctuation in the meteorological conditions, for example if a cloud that was masking the sun is blown away by the wind, and then stops being between the photovoltaic panels and the sun. In practice, this anticipation of the maximum upward variation slope can also correspond to a variation in power of 80% per minute (+80%/min, in this case).

The variations in the output power $P_{prod}$, although hardly predictable, are rather well characterised by the high and low anticipations of the average power $P_{moy,max}$ and $P_{moy,min}$ and by the expected maximum upward and downward variation slopes. Indeed, at each instant, it is known that, on the average (and in the absence of modulation), the output power $P_{prod}$:

will vary with a slope that, at most, is equal to the maximum slopes in question (in absolute value), and will remain between the high anticipation and the low anticipation of average power.

These anticipations can be refined by taking account of the modulation possibilities of the output power $P_{prod}$.

Figure 3:
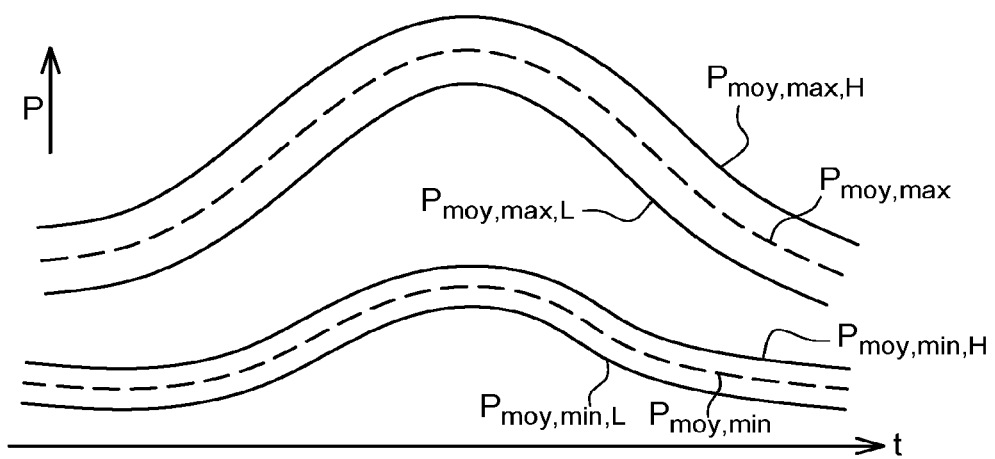
FIG. 3 diagrammatically shows minimum and maximum anticipated powers, for this production system.

FIG. 3 thus shows, among other things, a low average power anticipation modulated upwards $P_{moy,min,H}$. This low anticipation modulated upwards corresponds to the smallest expected output power, for the production system 1, for average meteorological conditions (without rapid fluctuation), the least favourable possible in terms of production (e.g.: sky remaining heavily charged with clouds, uniformly, all day long), the production system being modulated upwards. The low average power anticipation modulated upwards $P_{moy,min,H}$ is therefore equal, here, to the low average power anticipation $P_{moy,min}$, multiplied by the high modulation coefficient $C_{mod,H}$: $P_{moy,min,H} = P_{moy,min} \times C_{mod,H}$.

FIG. 3 also shows a low average power anticipation modulated downwards $P_{moy,min,L}$, a high anticipation of average power modulated upwards $P_{moy,max,H}$ and a high anticipation of average power modulated downwards $P_{moy,max,L}$, of which the definition are similar to what was given hereinabove for the low average power anticipation modulated upwards $P_{moy,min,H}$. We therefore have in particular: $P_{moy,min,L} = P_{moy,min} \times C_{mod,L}$, $P_{moy,max,H} = P_{moy,max} \times C_{mod,H}$ and $P_{moy,max,L} = P_{moy,max} \times C_{mod,L}$.

Data that represents:

maximum upward and downward variation slopes, high and low anticipations of average power $P_{moy,max}$ and $P_{moy,min}$, and/or high and low anticipations of average power modulated upwards $P_{moy,max,H}$, $P_{moy,min,H}$ and high and low anticipations of average power modulated downwards $P_{moy,max,L}$, $P_{moy,min,L}$ is stored in a memory 31 of a device for driving 3 the electricity production assembly 10 (this data is indeed particularly useful for the driving of this production assembly, as shall be explained in what follows).

Regarding now the storage system 2, it here comprises an assembly of electric batteries. Alternatively or as a supplement, the storage system could for example include a hydroelectric system that makes it possible to store energy by pumping water to a reservoir (natural or artificial) located at a height.

The energy stored in the storage system 2 at the instant considered, which is available and which can, if needed, be restored, is noted as $E_{stock}$ in what follows.

The storage system 2 delivers a storage power $P_{stock}$. When the storage system is driven in such a way as to store energy, the storage power $P_{stock}$ is negative. And when the storage system 2 is delivering, this power is positive.

The storage system 2 can be driven: the storage power $P_{stock}$ that it delivers can be controlled, in particular in such a way as to be negative (recharge), or positive (discharge).

The storage power $P_{stock}$ that the storage system 2 can deliver is between a maximum discharge power (positive) and a maximum charge power (negative).

The maximum charge and discharge powers each depend on the stored energy $E_{stock}$. For example, when the stored energy $E_{stock}$ is close to the maximum energy $E_{max}$ that can be stored in the storage system 2, the maximum charge power is clearly smaller, in absolute value, than when the stored energy $E_{stock}$ is equal to half of this maximum storable energy $E_{max}$. The link between the maximum charge power and the stored energy $E_{stock}$, and between the maximum discharge power and the stored energy $E_{stock}$, is given by an operating model of the storage system 2 (electrical or energy behaviour model). This link can have the form of a mathematical formula parameterised by coefficients specific to the storage system considered, or have the form of a table of correspondence that connects the maximum charge and discharge powers to the stored energy $E_{stock}$.

The model in question can take other state parameters of the storage system into account, in addition to the stored energy $E_{stock}$. By way of example, this model can also take account of the influence of the temperature $T_{emp}$ of the batteries, or of their state of health (SOH), on the maximum charge and discharge powers. It can also take account of constraints concerning the imposed charge and discharge conditions so as to limit the ageing of the electric batteries (constraints imposed in particular on charge and discharge powers). Moreover, the model in question makes it possible to predict the change in the state parameters of the storage system, in particular the change in the stored energy $E_{stock}$, when the storage system delivers a given electrical power.

This operating model can come from theoretical anticipations that take account of the physical characteristics of the storage system, or come from measurements taken on the storage system 2 in order to characterise it. It is stored in the memory 31 of the device for driving 3 mentioned hereinabove (in other terms, the characteristics of this model, such as tables of correspondence and/or analytical formulas parameterised by numerical coefficients, are stored in this memory 31).

The production assembly 10 delivers an electrical power $P_{out}$, called in what follows delivered power, to an electricity distribution network 20. The delivered power $P_{out}$ is the sum of the output power $P_{prod}$ and of the storage power $P_{stock}$.

The production system 1 and the storage system 2 are driven by the driving device 3 mentioned hereinabove.

The device for driving 3 comprises in particular a communications module with the production 1 and storage 2 systems, that bears reference 32, a processor 30, and the memory 31 mentioned hereinabove. Recall that this memory stores the operating module of the storage system 2, as well as the data concerning the expected minimum and maximum powers of the production system 1 in case of variations in the meteorological conditions.

The communication module 32, for example a digital data transmission and reception card, allows the device for driving 3 to send command instructions to the production 1 and storage 2 systems, in such a way as to drive the powers Pprod and $P_{stock}$ that they deliver. This module also allows the device for driving 3 to acquire data representative of the state parameters of the storage system mentioned hereinabove ($E_{stock}$, Temp, SOH).

Such as shown in FIG. 1, this device for driving is integrated into the production assembly 10. Alternatively, the driving device could however be relocated, the driving device then being remote from the production assembly (for example by several kilometres), the driving device then communicating with the production and storage systems via a telecommunication network such as internet (in this case, the driving device can for example be carried out in the form of a remote server, or be distributed between several separate entities, within a relocated "cloud"). Further alternatively, the driving device could be partially relocated, with only a portion of its components (for example those concerning the meteorological forecasts) being relocated.

Figure 4:
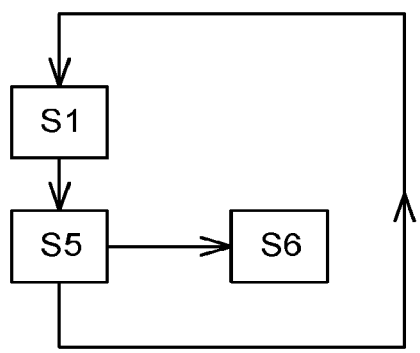
FIG. 4 diagrammatically shows steps of a method of driving the production assembly of FIG. 1.
Figure 6:
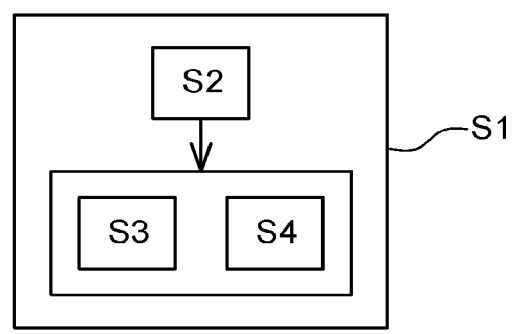
FIG. 6 shows in more detail one of the steps of the method of FIG. 4.

The device for driving 3 is programmed to implement the method for driving described hereinbelow, of which the main steps are shown in FIGS. 4 and 6.

This method here comprises the following steps, executed again at each time-step $t_i$ (FIG. 4):
- step S1: determining an interval $I_{P,A}$ of delivered powers, admissible for the production assembly 10 at the next (that is, at the following) time-step $t_{i+1}$, then
- step S5: determining a target power $P_C$ for the production assembly 10, the target power being determined in such a way as to be comprised in the interval of admissible powers $I_{P,A}$, then
- step S6: driving the production assembly 10 in such a way that the delivered power at the following time-step $t_{i+1}$, $P_{out}$, is equal to the target power $P_C$.

The steps S1 to S6 are then executed again.

During the step S1, the driving device 3 determines a maximum admissible power $P_H$ and a minimum admissible power $P_L$ for the production assembly 10. The interval of admissible powers $I_{P,A}$ extends from the minimum admissible power $P_L$ to the maximum admissible power $P_H$.

Figure 5:
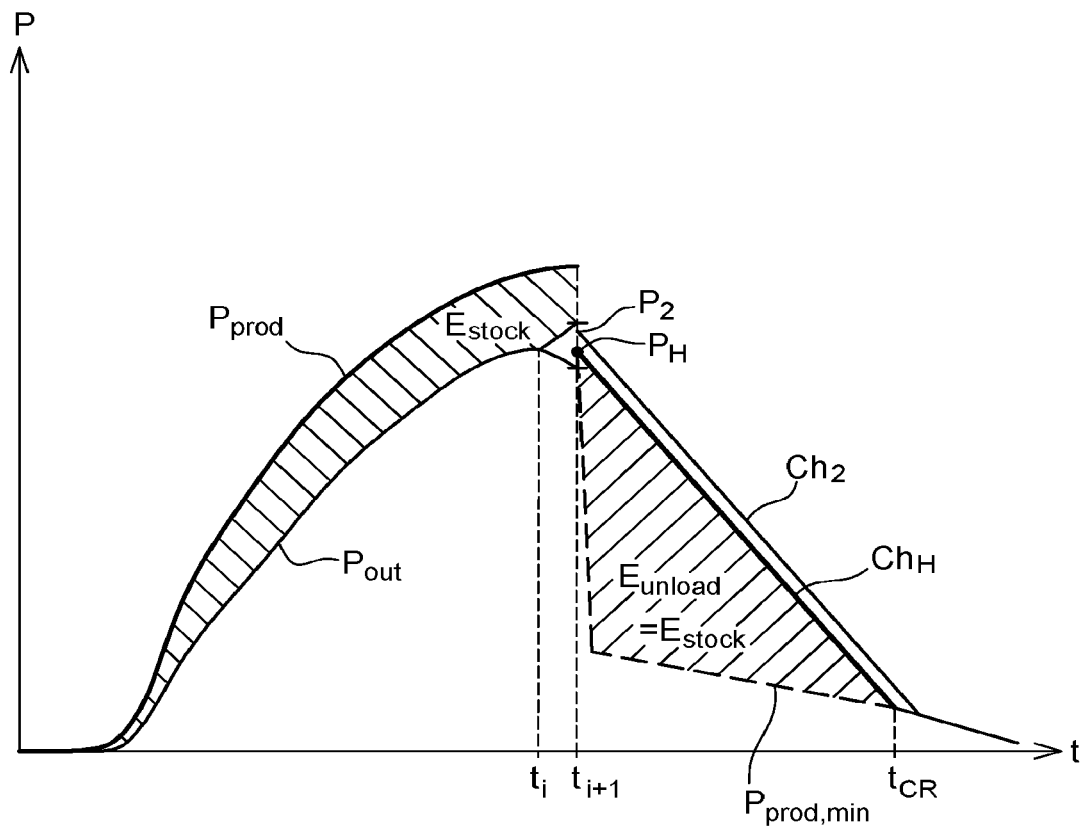
FIG. 5 diagrammatically shows the change over time of different electrical powers intervening in the method of FIG. 4.

The maximum admissible power $P_H$ is determined in such a way as to be the largest power such that: if the production assembly 10 delivered this power at the following time-step $t_{i+1}$, and if the meteorological conditions were to be degraded suddenly and sustainably starting from the following time-step $t_{i+1}$, then, it would be possible for the production assembly 10, thanks to the stored energy $E_{stock}$ present in the storage system 2, and possibly taking account of other constraints concerning the operating characteristics of the storage system such as its maximum discharge power and its maximum charge power, to reach, with a moderate slope, a sort of safety curve corresponding to a minimum anticipated power $P_{prod,min}$ (FIG. 5).

The minimum anticipated power $P_{prod,min}$ is the smallest expected power of the production system 1, starting from the following time-step $t_{i+1}$, in case of a sudden and sustainable degradation of the meteorological conditions.

The minimum anticipated power $P_{prod,min}$ and its change over time t are determined based on anticipations of output power that were presented hereinabove, during the presentation of the production system 1 (in particular based on the low average power anticipation $P_{moy,min}$, and based on the anticipation of the maximum slope with a downward variation $S_{fluct,min}$). The way in which the minimum anticipated power $P_{prod,min}(t)$ is determined will be presented in detail hereinbelow, in reference to FIG. 9 in particular.

"Moderate slope" here means a slope between a maximum authorised slope $S_{max}$ (positive) and a minimum authorised slope $S_{min}$ (negative), admissible from the point of view of the distribution network 20 which receives the delivered power $P_{out}$.

Indeed, as indicated in the preamble, for a distribution network, it is particularly problematic from a technical standpoint to have to manage a sudden variation in the electrical power that it receives from one of its suppliers. In order to authorise a connection to such a network, its management organisation therefore generally imposes that a production assembly deliver a power of which the slope remains between the slopes $S_{min}$ and $S_{max}$ in question.

These minimum and maximum authorised slopes can for example be equal respectively to $-10\%$ of an average power (or of an instantaneous power), per minute, and to $+10\%$ of this power, per minute.

FIG. 5 shows the way in which the maximum admissible power $P_H$ is determined, and the interest of this threshold power for driving the production assembly 10.

This figure shows a typical change in the output power $P_{prod}$ and the delivered power $P_{out}$, over time t over the course of a morning, until a given instant corresponding to the time-step $t_i$. In this example, up to the time-step $t_i$, the output power $P_{prod}$, generated by the production system 1, is greater than the delivered power $P_{out}$, delivered by the production assembly 10. All throughout this morning, a stored energy $E_{stock}$ is therefore progressively stored in the storage system 2 (assumed to be empty initially, at the beginning of the morning in question). This stored energy corresponds to the area of the surface that extends between the curve $P_{prod}(t)$ and the curve $P_{out}(t)$, in FIG. 5.

Beyond the current time-step $t_i$, the change in the output power $P_{prod}$, that can be subjected to changes in meteorological conditions, is not known. But, as explained hereinabove, the worst expected downward variation for the output power is however known, represented by the minimum anticipated power $P_{prod,min}$.

As shown in this figure, the maximum admissible power $P_H$ is such that:
- if the production assembly 10 delivers this power at the following time-step $t_{i+1}$, and if the output power $P_{prod}$ becomes equal to said minimum anticipated power $P_{prod,min}$ starting from the following time-step (the most unfavourable degradation that can be considered)
- then, the production assembly 10 can however, thanks to the energy $E_{stock}$ stored in the storage system, subsequently deliver a power that progressively reaches the minimum anticipated power $P_{prod,min}$, with a slope equal, at worst, to the minimum authorised slope $S_{min}$.

In this method, at the current time-step $t_i$, a maximum admissible power at the following time-step is therefore determined, taking account of a potential change in the operation of the production assembly, in particular beyond the following time-step $t_{i+1}$, in a case where the meteorological conditions were to be degraded.

Once the delivered power $P_{out}$ has reached the minimum anticipated power $P_{prod,min}$, the production assembly 10 can deliver a power that follows this minimum anticipated power (of which the change is generally progressive, except immediately after the current time-step $t_i$), and this even if the storage system 2 was completely discharged. The minimum anticipated power $P_{prod,min}$ therefore corresponds to a sort of safety curve to be reached, and the maximum admissible power $P_H$ is determined in such a way as to be able to reach it with a slope that remains moderate.

The fact that the stored energy $E_{stock}$, available at the considered time-step $t_i$ is sufficient to then progressively reach the minimum anticipated power $P_{prod,min}$ (in case of a degradation in the meteorological conditions), starting from the maximum admissible power $P_H$, can result in particular in the fact that: the electrical energy $E_{unload}$, that would be delivered by the storage system 2 during the passage from the maximum admissible power $P_H$ to the minimum anticipated power $P_{prod,min}$, with a slope equal to the minimum authorised slope $S_{min}$, is equal (or optionally less) than the stored energy $E_{stock}$ in question: $E_{unload} = E_{stock}$ (see FIG. 5).

In FIG. 5, the passing from the maximum admissible power $P_H$ (at the time-step $t_{i+1}$), to the minimum anticipated power $P_{prod,min}(t)$, with a slope equal to the minimum authorised slope $S_{min}$, is represented by the path $Ch_H$. And, from a graphical standpoint, the electrical energy $E_{unload}$ mentioned hereinabove corresponds to the area of the surface between this path $Ch_H$, and the curve $P_{prod,min}(t)$ from the following time-step $t_{i+1}$ to the subsequent instant tcr, for which the path $Ch_H$ reaches the curve $P_{prod,min}(t)$.

FIG. 5 shows another straight path Ch2, in the plane (t, $P_{out}$), of which the slope is equal to the minimum authorised slope $S_{min}$, and which, starting from the time-step $t_{i+1}$, starts from a power $P_2$ that is larger than the maximum admissible power $P_H$. It is understood in this figure that the energy $E_{stock}$, stored in the storage system 2 at the time-step $t_i$, is not large enough to, in case of a degradation in the meteorological conditions, allow the production assembly 10 to reach the minimum anticipated power $P_{prod,min}(t)$ by following the path Ch2.

It is therefore desirable to drive the production assembly 10 in such a way that it delivers, at the following time-step $t_{i+1}$, a power less than or equal to the maximum admissible power $P_H$.

In other terms, driving the production assembly 10 at a power $P_{prod}$ which, at each time-step, is less than the maximum admissible power $P_H$ in question, makes it possible to anticipate a degradation, considered as the worst that could occur, in the meteorological conditions. This thus makes it possible, in all circumstances, or in practically all circumstances, to deliver to the distribution network 20 a delivered power $P_{prod}$ of which the rate of change remains less than a maximum rate of change allowed by the network, i.e. of which the slope remains between the minimum and maximum authorised slopes $S_{min}$ and $S_{max}$, mentioned hereinabove.

In the method described here, the maximum admissible power $P_H$ is determined during a step S3 (FIG. 6) that comprises in particular a step of validating $S_T$ during which it is tested whether the maximum admissible power $P_H$ satisfies the following criterion (called the "low" criterion in what follows):
 if the production assembly 10 delivers the maximum admissible power $P_H$ at the following time-step $t_{i+1}$, and if the output power $P_{prod}$, generated by the production system 1, becomes equal to the minimum anticipated power $P_{prod,min}$ starting from the following time-step $t_{i+1}$,
 then, in view of the energy $E_{stock}$ stored in the storage system 2 at the considered time-step $t_i$, the production assembly 10 can subsequently deliver a delivered power $P_{out}$ that, over time t, progressively reaches the minimum anticipated power $P_{prod,min}$, while still varying with a slope that remains between the minimum authorised slope $S_{min}$ and the maximum authorised slope $S_{max}$.

During the step S3, the maximum admissible power $P_H$ is determined more precisely as being the largest electrical power that satisfies the "low" criterion in question.

Note however that the maximum admissible power $P_H$, obtained here thanks to a numerical maximisation procedure, does not necessarily correspond to an absolute maximum; it is rather a power which is determined in such a way as to be close to such an absolute maximum (with the difference between the two being less than a given tolerance/convergence threshold).

In practice, during step S3, for different electrical powers that can be considered (with the choice of these powers to be tested depending on the maximisation procedure used), if the low criterion mentioned hereinabove is verified, the maximum admissible power $P_H$ corresponding finally to the largest of the powers tested for which this criterion is verified, is successively tested.

During the driving of the production assembly 10, it is also interesting to take account of the fact that the output power $P_{prod}$ can not only fall suddenly, but also increase suddenly (for example when a cloud that was masking the sun moves away, quickly pushed by the wind). In case of a sudden increase, in order to limit the rate of change of the delivered power $P_{out}$, the storage system 2 is driven in such a way as to store energy (negative $P_{stock}$).

But the storage capacities of this system are necessarily limited. And, furthermore, at the instant considered, the storage system could already be almost completely charged. The storage system 2 can therefore overcome an increase in the output power $P_{prod}$ only to a certain degree.

When the target power $P_C$ to be delivered at the following time-step $t_{i+1}$ is determined, it is therefore desirable, as here, to take account of the fact that:
 the output power can also vary suddenly upwards, and that
 the storage system 2 has, at the considered time-step $t_i$, a certain storage margin, limited, equal to the difference between its total storage capacity ($E_{max}$), and the energy $E_{stock}$ already stored in this system.

It is to take account of these two aspects that the target power $P_C$ is chosen greater than the minimum admissible power $P_L$, in step S5.

Here, the minimum admissible power $P_L$ is determined, during a step S4 (FIG. 6), in such a way as to be the smallest electrical power for which the following "high" criterion is verified:
 if the production assembly 10 delivers the minimum admissible power $P_L$ at the following time-step $t_{i+1}$, and if the output power $P_{prod}$ by the production system 1 becomes equal to a maximum anticipated power $P_{prod,max}$ starting from the following time-step $t_{i+1}$,
 then, taking account of the storage margin of the storage system 2 at the considered time-step $t_i$, the production assembly 10 can subsequently deliver a delivered power $P_{out}$ that, over time t, progressively reaches said maximum anticipated power $P_{prod,max}$, while still varying with a slope that remains between the minimum authorised slope $S_{min}$ and the maximum authorised slope $S_{max}$.

The maximum anticipated power $P_{prod,max}$ is the largest expected power of the production system 1, starting from the following time-step $t_{i+1}$, in case of a sudden and sustainable variation, upwards, following a variation in the meteorological conditions.

As with the minimum anticipated power $P_{prod,min}$, the maximum anticipated power $P_{prod,max}$ and its change over time t are determined based on anticipations of power that were presented hereinabove, during the presentation of the production system 1 (in particular based on the high anticipation of the average power $P_{moy,max}$, and based on the anticipation of the maximum upward variation slope $S_{fluct,max}$). The way in which the maximum anticipated power $P_{prod,max}(t)$ is determined will be presented in detail hereinbelow (in reference to FIG. 9).

Before describing the steps S3 and S4 of determining minimum and maximum admissible powers in more detail, we shall return to steps S5 and S6 of the method for driving, introduced hereinabove during the presentation of FIG. 4.

Here, the step S5 comprises an acquiring of a required power $P_{dem}$, to be supplied to the electricity distribution network 20. The required power $P_{dem}$ can for example be keyed in by an operator (who can be a remote operator managing the electricity distribution network). The target power $P_C$ is then determined in such a way as to be as close as possible to the required power $P_{dem}$, while still being comprised in the interval of admissible powers $I_{P,A}$ determined hereinabove. Alternatively, a range of powers that corresponds directly to the interval $I_{P,A}$ in question could be proposed to the operator, with the latter then selecting an electrical power from this range, with the target power PC then being equal to the power thus selected.

During the following step S6, the production assembly 10 is driven, by the driving device 3, in such a way as to deliver the target power $P_C$, at the following time-step. This driving is carried out in a slightly different way according to whether or not the production system is modulable.

When the production system 1 is not modulable, the driving device 3 drives the storage power $P_{stock}$ delivered by the storage system 2 (to a negative value when it entails charging this system, and to a positive value when it entails having it delivered), in such a way that the total power $P_{out}$ delivered by the production assembly reaches the target power $P_C$, at the following time-step $t_{i+1}$.

But when the production system 1 can be driven, as here, several solutions can be considered to reach the target power $P_C$, in step S6. By way of example, in order to vary the delivered power $P_{out}$, it is for example possible to modulate the output power $P_{prod}$ while still maintaining the storage power $P_{stock}$ at the same value as hereinabove. It is also possible, on the contrary, to maintain the output power $P_{prod}$ at the same value as hereinabove, and modifier the storage power $P_{stock}$ (for example by decreasing the charge rate of the batteries).

At step S6, when the production system 1 can be driven, it is driven for example, in such a way that the modulation coefficient $C_{mod}$ has the highest possible value, compatible with the fact that the delivered power $P_{out}$ has to reach the target power $P_C$ at the following time-step (even, in order to reach the target power $P_C$, having to consequently adjust the charge rate of the batteries i.e. the storage power). This arrangement makes it possible to maximise the output power, for a given target power (the surplus energy then being stored in the storage system). During this step, it can also be provided to control the modulation coefficient $C_{mod}$ at the highest value possible, compatible with the target power $P_C$ to be reached for the production assembly (as explained hereinabove), but while still limiting this modulation coefficient to a value less than or equal to 1 (in order to retain a modulation margin upwards).

Now that the main steps S1, S5 and S6 have been presented as a whole, the step S1, which plays a central role in this method, can be described in more detail.

This step comprises here the following steps (FIG. 6):
step S2: determining an interval $I_{P,E}$ of delivered powers, that can be considered for the production assembly 10 at the following time-step $t_{i+1}$, making it possible to obtain, between the time-steps $t_i$ and $t_{i+1}$, a variation slope between the minimum authorised slope $S_{min}$ and the maximum authorised slope $S_{max}$ (FIG. 7),
step S3 (already mentioned): determining the maximum admissible power $P_H$, by seeking, in the interval $I_{P,E}$ in question, the largest electrical power that satisfies the "low" criterion mentioned hereinabove, and
step S4 (already mentioned): determining the minimum admissible power $P_L$, by seeking, in the interval $I_{P,E}$, the smallest electrical power that satisfies the "high" criterion presented hereinabove.

Figure 7:
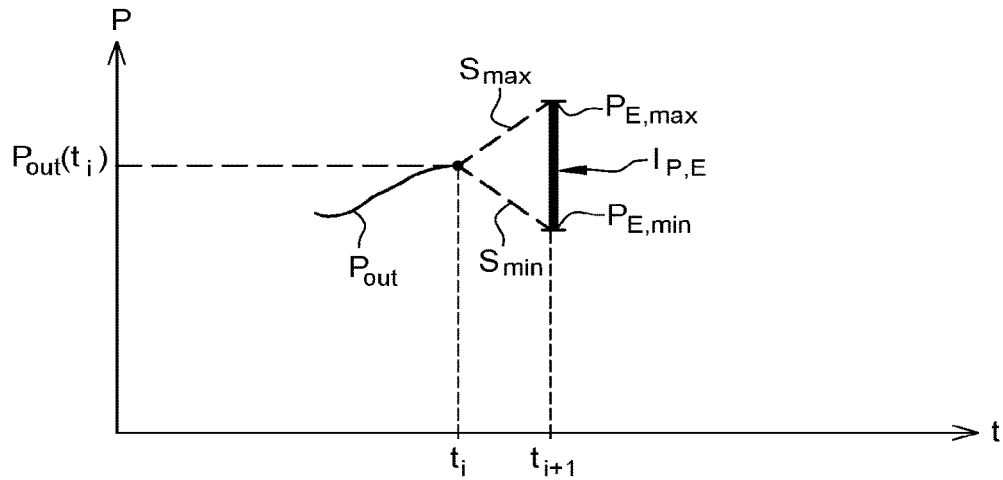
FIG. 7 diagrammatically shows an interval of powers that can be considered determined during the method of FIG. 4.

The interval of powers that can be considered $I_{P,E}$, determined in step S2 extends from a minimum acceptable power $P_{E,min}$ to a maximum acceptable power $P_{E,max}$ (FIG. 7).

The minimum acceptable power $P_{E,min}$ is determined in such a way that, in the plane (t, $P_{out}$), the slope of the segment that connects the point of coordinates $[t_i, P_{out}(t_i)]$, to the point of coordinates $[t_{i+1}, P_{E,min}]$ is equal to the minimum authorised slope $S_{min}$ mentioned hereinabove.

Likewise, the maximum acceptable power $P_{E,max}$ is determined in such a way that, in the plane (t, $P_{out}$), the slope of the segment that connects the point of coordinates $[t_i, P_{out}(t_i)]$, to the point of coordinates $[t_{i+1}, P_{E,max}]$ is equal to the maximum authorised slope $S_{max}$.

One of the objectives of the method of driving is to prevent the delivered power $P_{out}$ from varying with a slope greater than the slope $S_{max}$, or less than the slope $S_{min}$. The target power $P_C$, which will deliver the production assembly 10 at the following time-step, must therefore be comprised in the interval of powers that can be considered $I_{P,E}$. Since this target power $P_C$ must finally be comprised in the interval $I_{P,E}$, it is therefore interesting, right from step S3, to limit the search for the maximum admissible power $P_H$ to this interval. This indeed reduces the domain wherein this power is sought (this domain is reduced to its useful portion in practice), and thus accelerates the determination of the maximum admissible power $P_H$, from a numerical standpoint. Likewise, limiting the search for the minimum admissible power $P_L$ to the interval $I_{P,E}$, during step S4, makes it possible to accelerate this recherche, by setting aside right from the start of this search the powers that are incompatible with a sufficiently progressive variation of the delivered power $P_{out}$.

The steps S3 and S4 in themselves are now described in more detail. A first alternative of these steps, wherein the production system 1 is not modulated (i.e. for which $C_{mod}$ remains constant, equal to 1) is described first, in reference to FIGS. 8 to 12. A second alternative, wherein account is taken of the modulation possibilities of the production system 1, is then described, in reference to FIGS. 13 to 19.

Figure 8:
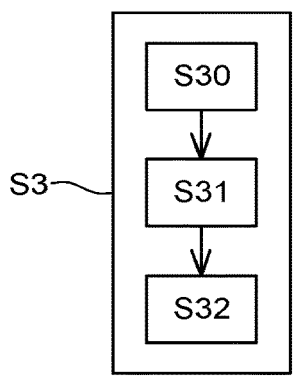
FIG. 8 shows in more detail certain steps of the method of FIG. 4.

As can be seen in FIG. 8, the step S3 here comprises the following steps:
step S30: determining the minimum anticipated power $P_{prod,min}$, then
step S31: determining a low safety curve $P_{safe,L}$, then
step S32: determining the maximum admissible power $P_H$.

During the step S30, the minimum anticipated power $P_{prod,min}$ is determined as follows (see FIG. 9):
the minimum anticipated power $P_{prod,min}$ is equal, at the considered time-step $t_i$, to the output power $P_{prod}$, actually generated by the production system 1 at this instant,
the minimum anticipated power $P_{prod,min}$ then decreases linearly over time t with a slope equal to the anticipation of the maximum downward variation slope $S_{fluct,min}$, expected, on the average, for the production system 1, in case of a sudden fluctuation in the meteorological conditions, then
as soon as the minimum anticipated power $P_{prod,min}$ reaches the low average power anticipation $P_{moy,min}$, the minimum anticipated power is equal to the low average power anticipation $P_{moy,min}$ (in other terms, the minimum anticipated power $P_{prod,min}$ then follows the low average power anticipation $P_{moy,min}$).

As already explained, the minimum anticipated power $P_{prod,min}$ (which is a magnitude that varies over time) constitutes to a certain extent a scenario representative of the worst downward variation expected for the output power $P_{prod}$, in case of a degradation in the meteorological conditions starting from the time-step $t_i$.

Figure 9:
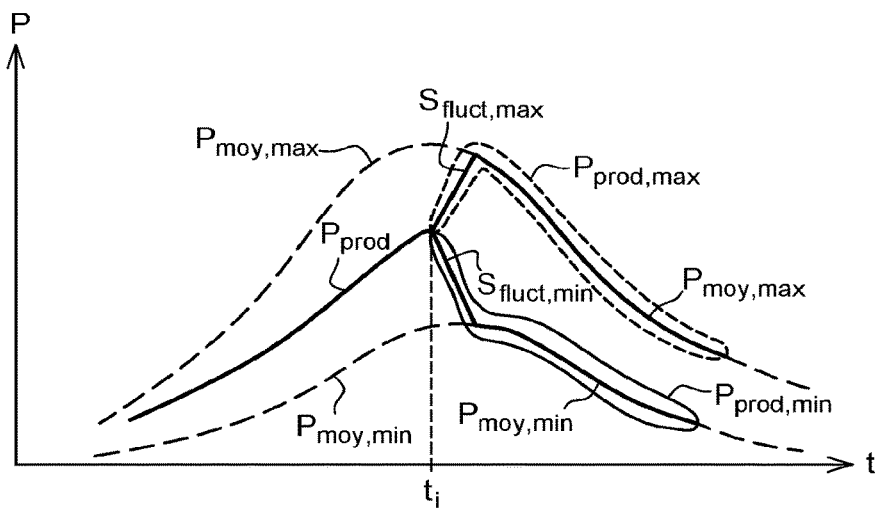
FIG. 9 graphically shows the way in which a minimum anticipated power is determined, intervening in the method of FIG. 4.

The maximum anticipated power $P_{prod,max}$ is determined in a manner that is completely similar to that which was presented hereinabove for the minimum anticipated power $P_{prod,min}$, but according to the high anticipation of the average power $P_{moy,max}$ and the anticipation of the maximum upward variation slope $S_{fluct,max}$, instead of being determined according to the power $P_{moy,min}$ and the slope $S_{fluct,min}$ (see FIG. 9).

The low safety curve $P_{safe,L}$ determined in step S31 is constituted, in a simulation plane of which the X-axis is time t and of which the Y-axis is an electrical power, by the portion of the curve representative of the minimum anticipated power $P_{prod,min}$ for which the slope is, at each instant, between the minimum authorised slope $S_{min}$ and the maximum authorised slope $S_{max}$.

Figure 10:
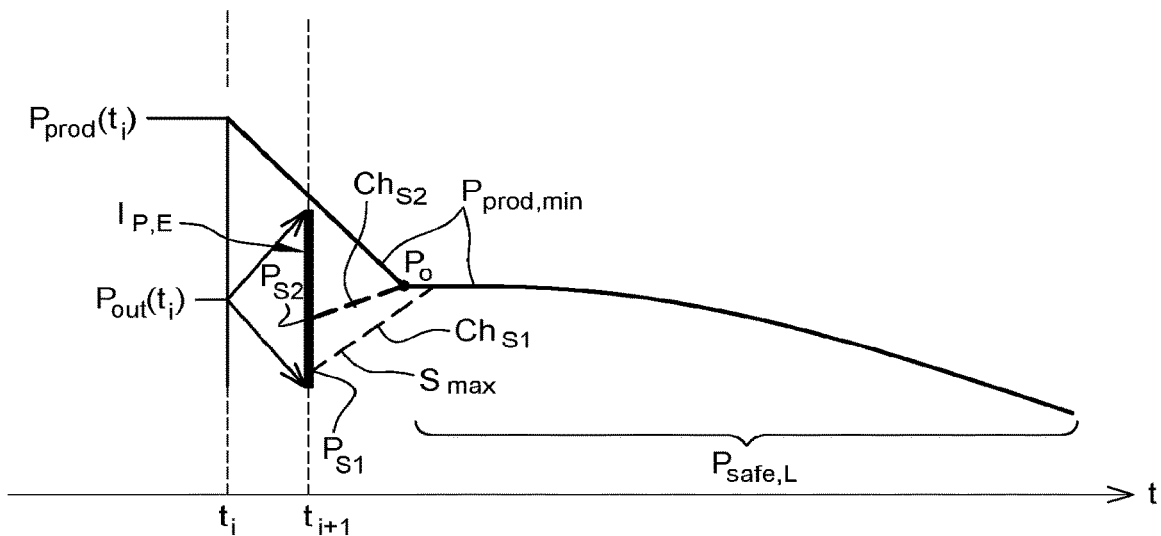
FIG. 10 graphically shows the way in which simulation paths are determined, used to test the subsequent change in the production assembly, in the method in question.

Here, the anticipation of the maximum downward variation slope $S_{fluct,min}$ (typically −80%/minute) is larger, in absolute value, than the minimum authorised slope (typically −10% per minute). The portion of the curve $P_{prod,min}(t)$ that corresponds to the linear decrease with a slope $S_{fluct,min}$ is therefore not part of the safety curve $P_{safe,L}$, here. On the other hand, in general, the low average power anticipation $P_{moy,min}$ varies over time with a moderate slope, to the extent that the safety curve $P_{safe,L}$ corresponds in general to the second portion of the curve $P_{prod,min}(t)$, for which $P_{prod,min}=P_{moy,min}$ (FIG. 10).

During the step S32, the maximum admissible power $P_H$ is determined by a maximisation procedure, by seeking, in the interval of powers that can be considered $I_{P,E}$ the largest power that satisfies the low criterion.

This maximisation procedure can for example be carried out by dichotomy.

In this case, during step S32, we begin be testing whether the maximum acceptable power $P_{E,max}$ satisfies the low criterion mentioned hereinabove, by executing the step of validating $S_T$ for the power $P_{E,max}$. If the power $P_{E,max}$ satisfies this criterion, the maximum admissible power $P_H$ is then determined as being equal to $P_{E,max}$ (and the maximisation procedure stops). Otherwise, the step of validating $S_T$ is executed again, for a power equal to half of the sum of $P_{E,max}$ and of $P_{E,min}$, in order to test whether this median power satisfies the low criterion.

If this median power satisfies the criterion in question, a power is then tested equal to half the sum of the median power in question, and of the maximum acceptable power $P_{E,max}$. On the contrary, if the median power does not satisfy the low criterion, a power is then tested equal to half of the sum of the median power and of the minimum acceptable power $P_{E,min}$, and so on.

This search via dichotomy stops when a convergence criterion is satisfied, for example when a difference between two powers, tested during two successive executions of the step of validating $S_T$, is less than a given fixed threshold.

Note that, at the end of this maximisation procedure, the maximum admissible power is effectively the power that, among the various powers tested, is the largest power that satisfies the low criterion.

Also note that the maximisation procedure implemented in step S32 could be executed in accordance with a numerical method other than the method via dichotomy presented hereinabove.

The step of validating $S_T$, which is executed for different powers to be tested, here comprises the following steps (FIG. 12):

$S_{T,0}$: determining a simulation path $Ch_{S1}$, $Ch_{S2}$ that connects: a point of departure $P_{S1}$, $P_{S2}$ of which the coordinates are the following time-step $t_{i+1}$ and the power to be tested, to the low safety curve $P_{safe,L}$, and $S_{T,1}$: testing the low criterion, by carrying out a numerical simulation of the change in the power delivered by the electricity production assembly 10, during which it is tested whether the production assembly 10 can reach said safety curve $P_{safe,L}$, by following the simulation path $Ch_{S1}$, $Ch_{S2}$, in view of the energy $E_{stock}$ stored in the storage system 2 at the time-step $t_i$.

Here, during step $S_{T,0}$, the simulation path $Ch_{S1}$, $Ch_{S2}$ is determined in such a way as to:

have a slope between the minimum authorised slope and the maximum authorised slope, and in such a way as to have, in the simulation plane (t, $P_{out}$), the shortest length in view of the constraints in question (the path in question is therefore straight, in the simulation plane).

FIG. 10 shows the simulation path $Ch_{S1}$, $Ch_{S2}$ for two different powers to be tested (comprised in the interval $I_{P,E}$), corresponding to two starting points $P_{S1}$ and $P_{S2}$. For the power corresponding to the point of departure $P_{S1}$, the shortest path to reach the safety curve, noted as $Ch_{S1}$, is a straight path of which the slope is equal to the largest authorised slope, $S_{max}$. For the power corresponding to the other point of departure $P_{S2}$, the shortest path to reach the safety curve, $Ch_{S2}$, is a straight path, with an intermediate slope between the minimum and maximum authorised slopes, and which connects the point of departure $P_{S2}$ to the first point, Po, of the low safety curve $P_{safe,L}$ (the first point Po of this curve is the point of the curve that corresponds to the instant starting from which this curve begins).

Determining the simulation path $Ch_{S1}$, $Ch_{S2}$ as indicated hereinabove is particularly interesting because this type of path makes it possible to reach the safety curve rapidly, by soliciting as little as possible the storage system 2, of which the storage and restoring capacities are limited.

In other terms, by choosing the simulation path in this way, if the low criterion is not verified, it is the production assembly 10 that cannot, in view of the stored energy $E_{stock}$ at time-step $t_i$, reach the safety curve, even by following this path for which the storage system 2 is the least solicited. Carrying out the step of validating in this way therefore makes it possible to obtain, for the maximum admissible power $P_H$, a particularly reliable and realistic value.

Alternatively, the simulation path determined in step $S_{T,0}$, could be determined as explained hereinbelow.

Figure 11:
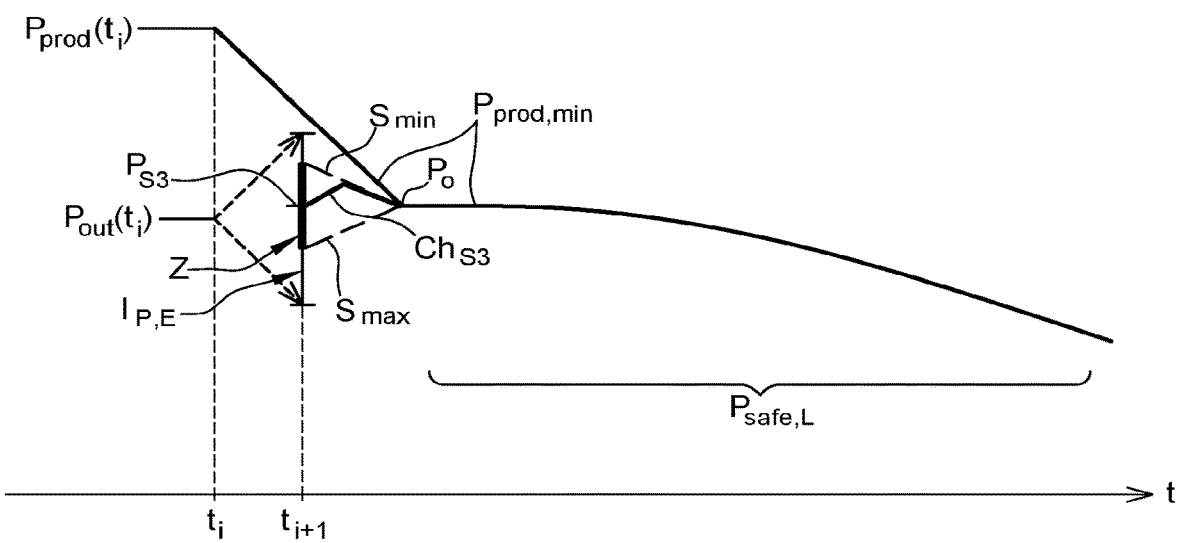
FIG. 11 graphically shows an alternative way of determining such simulation paths.
Figure 12:
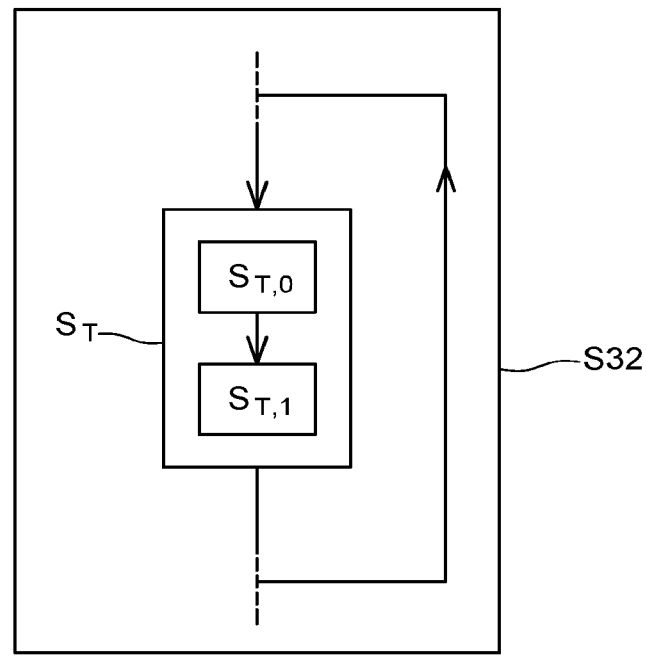
FIG. 12 diagrammatically shows steps implemented during the execution of a step of validating, carried out during the method in question.
Figure 13:
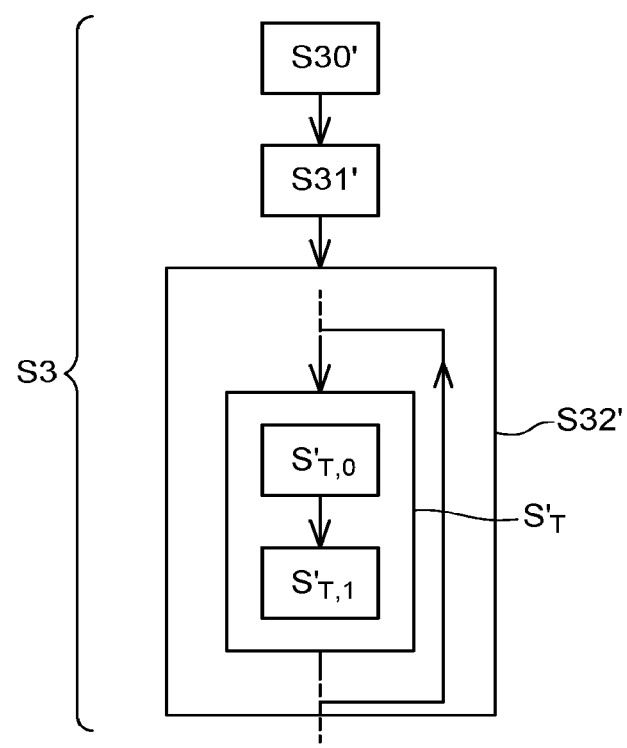
FIG. 13 diagrammatically shows steps implemented in this method, in a case where the modulation possibilities of the output power, generated by the production system, are taken into account.
Figure 14:
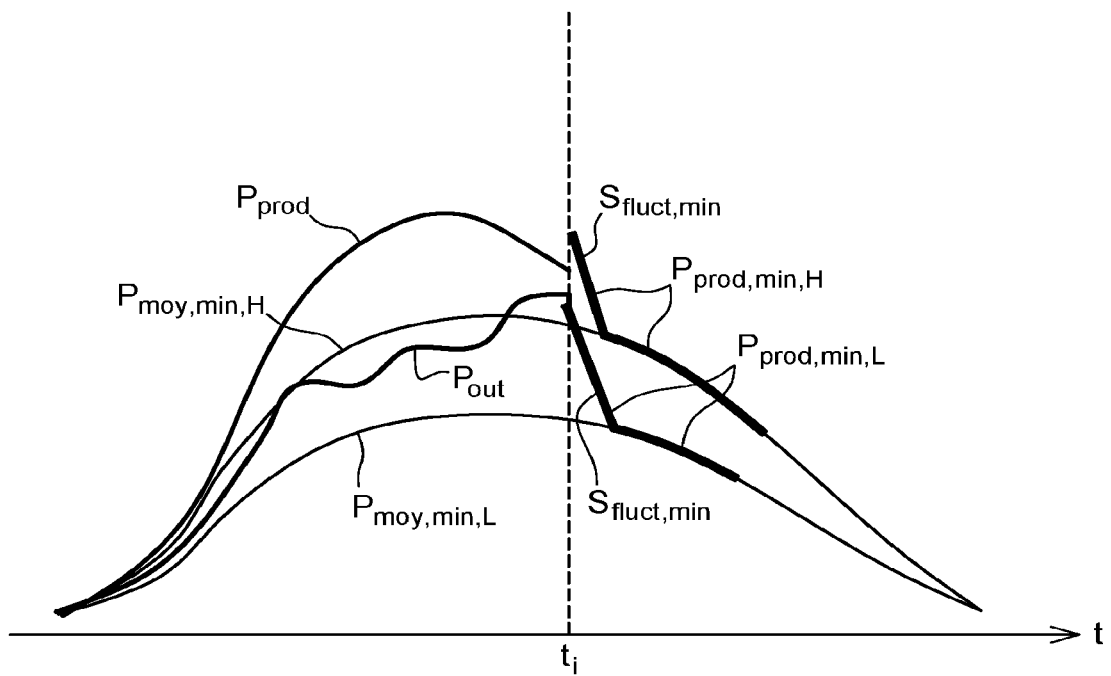
FIG. 14 graphically shows the way in which minimum anticipated powers are determined, modulated upwards, and downwards.

First of all, a zone is determined, called zone of proximity Z in what follows, which, for the time-step $t_{i+1}$, corresponds to the powers that make it possible to reach the first point Po of the low safety curve $P_{safe,L}$ with a slope between the minimum authorised slope $S_{min}$ and the maximum authorised slope $S_{max}$ (FIG. 11).

If the power to be tested is located outside the zone of proximity Z, above this zone, then the simulation path is a straight path, of which the slope is equal to the minimum authorised slope $S_{min}$.

If the power to be tested is located outside the zone of proximity Z, below this zone, then the simulation path is a straight path, of which the slope is equal to the maximum authorised slope $S_{max}$.

And if the power to be tested is located in the zone of proximity Z, then the simulation path comprises a first straight portion, of slope $S_{max}$, then a second straight portion, of slope $S_{min}$, that ends at the first point Po of the low safety curve (case of the simulation path $Ch_{S3}$, in FIG. 11).

This type of path also allows for a reduced solicitation of the storage system 2, during the transition ranging from the power to be tested to the safety curve.

During step $S_{T,1}$, as already indicated, a numerical simulation of the change in the power delivered by the electricity production assembly 10 is carried out, during which it is tested whether the production assembly 10 can reach the low safety curve $P_{safe,L}$, by following the simulation path $Ch_{S1}$, $Ch_{S2}$; $Ch_{S3}$ determined hereinabove, in view of the energy $E_{stock}$ stored in the storage system 2 at the time-step $t_i$.

This simulation is carried out by taking account in particular of the fact that the maximum discharge power of the storage system 2, as well as its maximum charge power, depend on the stored energy in the latter. This dependency is represented by the operating module of the storage system 2 that was presented hereinabove, and of which the characteristics are stored in the memory 31.

Here, during this simulation, in addition to stored energy $E_{stock}$, other state parameters of the storage system 2 are taken into account, such as the temperature $T_{emp}$ of the batteries, or their state of health SOH, and of the influence of these state parameters on the maximum charge and discharge powers (via the operating module of the storage system).

The step S4, of determining the minimum admissible power $P_L$, is determined in a completely similar manner (symmetrical) of what was presented hereinabove for the step S3, but:

based on the maximum anticipated power $P_{prod,max}$, instead of the minimum anticipated power $P_{prod,min}$, and testing the high criterion, instead of the low criterion, and by a minimisation procedure (for example by dichotomy), instead of a maximisation procedure.

The manner for carrying out the steps S3 and S4 (determining minimum and maximum admissible powers $P_H$ and $P_L$), when account is taken of the modulation possibilities of the production system 1, is presented now, in reference to FIGS. 13 to 19.

Modulating the power delivered by the production system 1 according to the variations in the meteorological conditions, in addition to adjusting the power received or delivered by the storage system 2 according to these conditions, allows for a more effective smoothing of the variations in the delivered power $P_{out}$.

Taking account of these modulation possibilities allows for a finer and more realistic determination of the range of powers wherein the target power can be chosen. Thus, the maximum admissible power $P_H$ determined in this way is generally larger than that obtained by a determination, somewhat more severe, that does not take account of the modulation possibilities of the production system. And a determining as best possible of the minimum and maximum admissible powers, such as proposed hereinbelow (i.e.: taking account of the modulation possibilities in question) is interesting in practice, because this then makes it possible, in step S5, to provide the operator with a range of admissible powers that is as wide as possible. In other terms, this makes it possible to provide the operator with a range of admissible solutions, for the delivered power at which to drive the production assembly at the following time-step, which is as large as possible (in view of the constraints to be respected mentioned hereinabove). This therefore allows the operator to choose a solution (an operating type) that is the most effective in terms of the production/storage ratio (i.e.: this makes it possible to maximise the total electric power injected into the network, by giving more adjusting latitude since the operating limits $P_H$ and $P_L$ are calculated by taking account of the modulation possibilities in question).

In this case (taking account of the modulation possibilities), the step S3 comprises the following steps (FIG. 13):

step S30': determining a minimum anticipated power modulated downwards $P_{prod,min,L}$, and a minimum anticipated power modulated upwards $P_{prod,min,H}$, then step S31': determining a low safety zone $Z_{safe,L}$, in the simulation plane (t, $P_{out}$), then step S32': determining the maximum admissible power $P_H$.

During the step S30', the minimum anticipated power modulated downwards $P_{prod,min,L}$, is determined as follows (see FIG. 14):

the minimum anticipated power modulated downwards $P_{prod,min,L}$ is equal, at the considered time-step $t_i$, to the output power $P_{prod}$, actually generated by the production system 1 at this instant, multiplied by the low modulation coefficient $C_{mod,L}$, the minimum anticipated power modulated downwards $P_{prod,min,L}$ then decreases linearly over time t with a slope equal to the anticipation of the maximum downward variation slope $S_{fluct,min}$, expected, on the average, for the production system 1, in case of a sudden fluctuation in the meteorological conditions, then as soon as the minimum anticipated power modulated downwards $P_{prod,min,L}$ reaches the low average power anticipation modulated downwards $P_{moy,min,L}$, the minimum anticipated power modulated downwards $P_{prod,min,L}$ remains equal to the low average power anticipation modulated downwards $P_{moy,min,L}$, by following the change in this power.

The minimum anticipated power modulated upwards $P_{prod,min,H}$ is determined in a similar way, but based on the low average power anticipation modulated upwards (not downwards), $P_{moy,min,H}$.

The low safety zone $Z_{safe,L}$ determined in step S31' is constituted, in the simulation plane of which the X-axis is time t and of which the Y-axis is an electrical power, by a zone:

which is between: the curve representative of the minimum anticipated power modulated downwards $P_{prod,min,L}$, and the curve representative of the minimum anticipated power modulated upwards $P_{prod,min,H}$ (FIGS. 15 and 16), and within which the electrical power can change, over time, with a slope that remains between the minimum and maximum authorised slopes $S_{min}$ and $S_{max}$.

Figure 15:
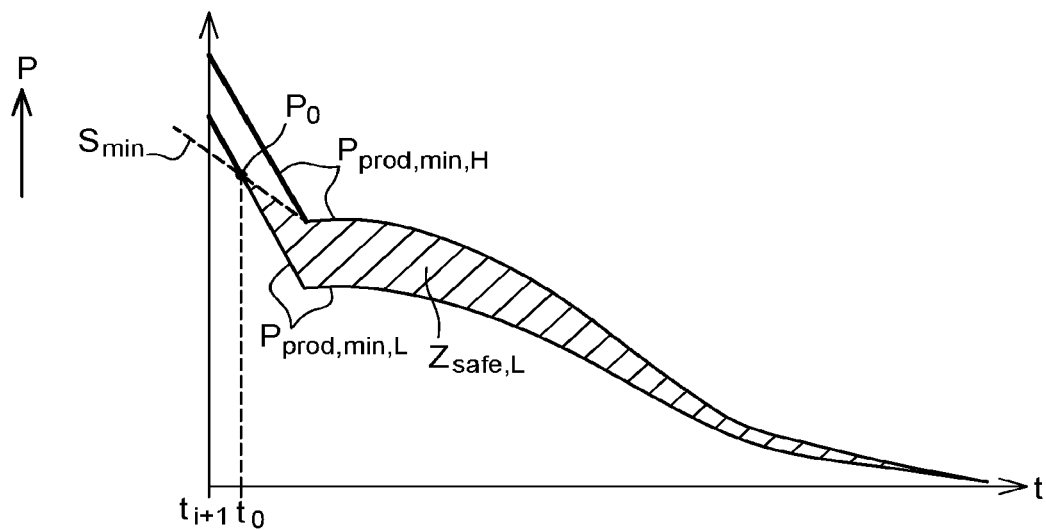
FIG. 15 graphically shows the way in which a low safety zone is determined.
Figure 18:
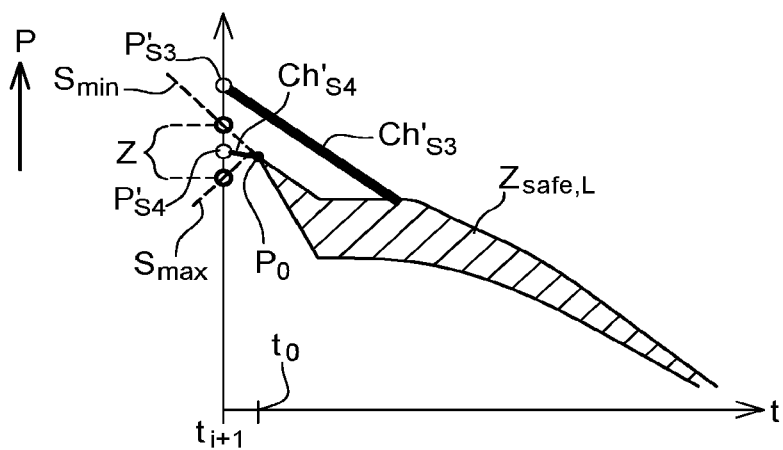
FIG. 18 graphically shows the way in which the simulation paths are determined, in another case.

Recall that, here, the minimum authorised slope $S_{min}$ is smaller, in absolute value, than the anticipation of the maximum downward variation slope $S_{fluct,min}$. In general, the low safety zone $Z_{safe,L}$ therefore extends starting from a date to which is after the time-step $t_{i+1}$ (FIGS. 15 and 18). The first point of the low safety zone $Z_{safe,L}$, i.e. the for which t=to, is noted as Po.

Figure 16:
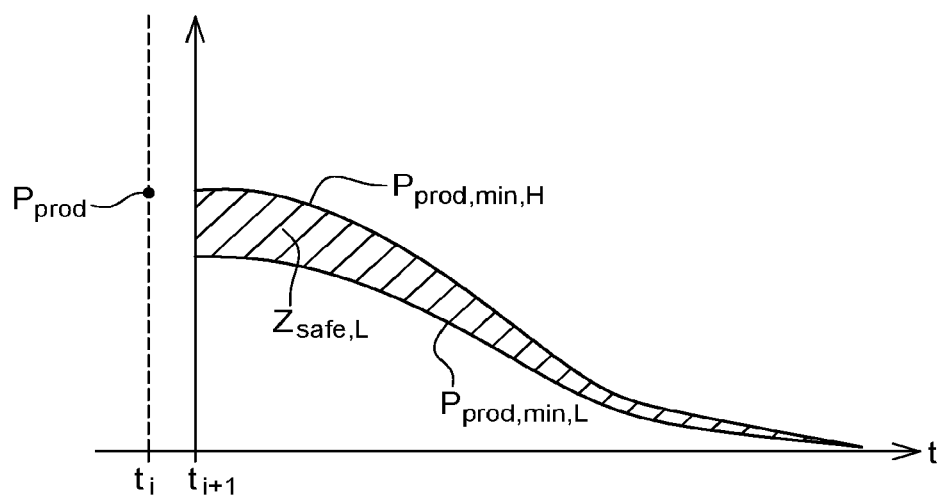
FIG. 16 graphically shows the way in which the low safety zone is determined, in another case.

In certain circumstances, in particular if the output power $P_{prod}(t_i)$ is close to the low anticipations of the average power $P_{moy,min,L}$ and $P_{moy,min,H}$, the low safety zone $Z_{safe,L}$ can however start right from time-step $t_{i+1}$, and occupy the entire zone between the minimum anticipated power modulated downwards $P_{prod,min,L}$, and the minimum anticipated power modulated upwards $P_{prod,min,H}$ (FIG. 16).

During the following step S32', the maximum admissible power $P_H$ is sought, within the interval of admissible powers $I_{P,E}$, by a maximisation procedure such as that described hereinabove (during the presentation of step S32). During this maximisation procedure, the step of validating, $S'_T$, is however carried out in a manner different from what was described hereinabove, in the case where the modulation possibilities were not taken into account (FIGS. 8 to 12).

Here, the step of validating $S'_T$ then comprises the following steps (FIG. 13):

$S'_{T,0}$: determining a simulation path $Ch'_{S1}$, $Ch'_{S2}$, $Ch'_{S3}$, $Ch'_{S4}$; $Ch'_{S5}$, that connects a point of departure $P'_{S1}$, $P'_{S2}$, $P'_{S3}$, $P'_{S4}$, of which the coordinates are the following time-step $t_{i+1}$ and the power to be tested, to the low safety zone $Z_{safe,L}$, and $S'_{T,1}$: testing the low criterion, by carrying out a numerical simulation of the change in the power delivered by the electricity production assembly 10, during which it is tested whether the production assembly 10 can reach the low safety zone $Z_{safe,L}$, by following the simulation path determined hereinabove, in view of the energy $E_{stock}$ stored in the storage system 2 at the time-step $t_i$.

During the step $S'_{T,0}$, the simulation path $Ch'_{S1}$, $Ch'_{S2}$, $Ch'_{S3}$, $Ch'_{S4}$ is determine, here again, in such a way as to:

have a slope between the minimum authorised slope $S_{min}$ and the maximum authorised slope $S_{max}$, and in such a way as to have, in the simulation plane (t, $P_{out}$), the shortest length in view of these constraints (the path in question is therefore straight, in the simulation plane).

In other terms, the simulation path is determined here in such a way as to enter as quickly as possible in the low safety zone $Z_{safe,L}$ (this path is therefore, here again, that for which the storage system 2 is the least solicited).

Figure 17:
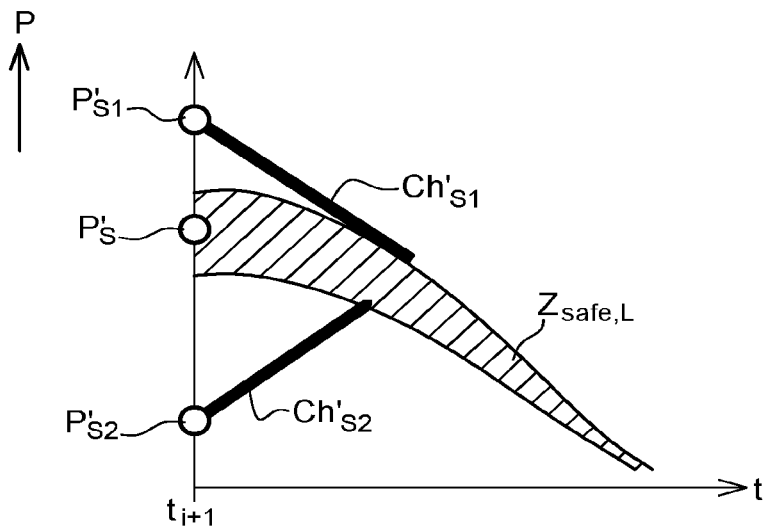
FIG. 17 graphically shows the way in which simulation paths are determined, when modulation possibilities of the output power, generated by the production system, are taken into account.

FIG. 17 shows the simulation path $Ch'_{S1}$, $Ch'_{S2}$ for two different powers to be tested, corresponding to two starting points $P'_{S1}$ and $P'_{S2}$, in a case where the low safety zone $Z_{safe,L}$ starts right from time-step $t_{i+1}$. For the power corresponding to the point of departure $P'_{S1}$, located above the safety zone (corresponding to a power greater than $P_{prod,min,H}$), the shortest path to reach the safety zone, $Ch'_{S1}$, is a straight path of which the slope is the minimum authorised slope, $S_{min}$. For the power corresponding to the other point of departure $P'_{S2}$, located below the low safety zone, the shortest path to reach the safety zone, $Ch'_{S2}$, is a straight path, with a slope equal to the maximum authorised slope, $S_{max}$. A third point P's, corresponding to a power already located in the safety zone, is also shown in this figure. For this third point, no simulation path is determined. Indeed, for the power corresponding to this point, it is not necessary to execute the following step of validating $S'_{T1}$. Indeed, it is then not necessary to test whether the production assembly can reach the safety zone, since it is already there.

FIG. 18 shows the simulation path $Ch'_{S3}$, $Ch'_{S4}$ for two different powers to be tested, corresponding to two starting points $P'_{S3}$ and $P'_{S4}$, in a case where the low safety zone $Z_{safe,L}$ starts at a date to after the time-step $t_{i+1}$.

This figure also shows a zone of proximity Z. As hereinabove, this zone of proximity corresponds to all the powers, that, for the time-step $t_{i+1}$, make it possible to reach the first point Po of the low safety zone $P_{safe,L}$ with a slope between the minimum authorised slope $S_{min}$ and the maximum authorised slope $S_{max}$.

The point of departure $P'_{S3}$ is located above this zone of proximity Z. The corresponding simulation path, $Ch'_{S3}$, is therefore a straight segment, of slope $S_{min}$, connecting the point $P'_{S3}$ to the low safety zone $Z_{safe,L}$.

The other point of departure shown as an example in this figure, $P'_{S4}$, is located in the zone of proximity Z. For this point of departure, the simulation path is a straight segment that connects the point $P'_{S4}$ to the first point Po of the safety zone.

Alternatively (as for the case without taking account of the modulation), the simulation path determined in step $S'_{T,0}$, could be determined as explained hereinbelow, in the cases where the low safety zone starts from a date to after the time-step $t_{i+1}$.

If the power to be tested is located outside the zone of proximity Z, above this zone, then the simulation path is a straight path, of which the slope is the minimum authorised slope $S_{min}$ (case of the simulation path $Ch'_{S3}$, in FIG. 18).

If the power to be tested is located outside the zone of proximity Z, below this zone, then the simulation path is a straight path, of which the slope is the maximum authorised slope $S_{max}$.

Figure 19:
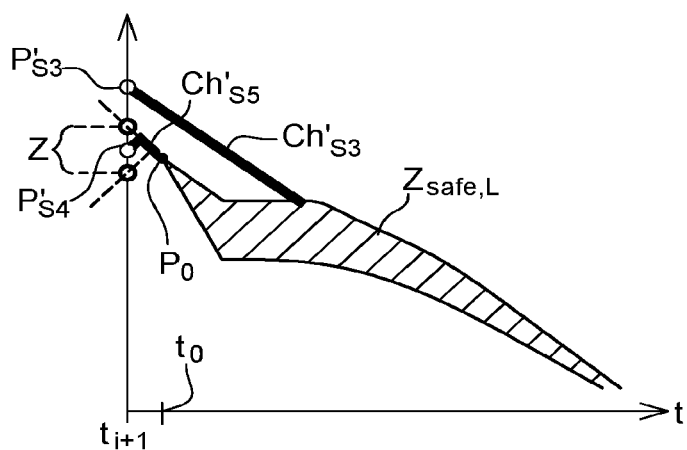
FIG. 19 graphically shows an alternative way of determining the simulation paths.

And if the power to be tested is located in the zone of proximity Z, then, the simulation path comprises a first straight portion, of slope $S_{max}$, then a second straight portion, of slope $S_{min}$, that ends at the first point Po of the low safety zone (case of the simulation path $Ch'_{S5}$, in FIG. 19).

Regarding now the step of simulation, $S'_{T,1}$, it is carried out in the same way as in the "without modulation" case described hereinabove, but by taking account of the possibility of modulating the expected output power.

Further note that, in this case also (where account is taken of the modulation possibilities of the production system 1), the criterion tested during the step of validating $S'_T$ is the low criterion mentioned hereinabove, namely: can the production assembly progressively reach, with a moderate slope, a minimum anticipated power, thanks to the energy stored in the storage system at the considered time-step.

But as account is taken here of the modulation possibilities of the production system 1, the minimum anticipated power, of which it is sought to know if it can be progressively reached by the production assembly, can be any of the modulated anticipated minimum powers, between the minimum anticipated power modulated downwards $P_{prod,min,L}$, and the minimum anticipated power modulated upwards $P_{prod,min,H}$.

The step S4, of determining the minimum admissible power $P_L$, is determined in a completely similar manner (symmetrical) of what was presented hereinabove for the step S3, but based on maximum anticipated powers, modulated upwards, and downwards, $P_{prod,max,H}$, $P_{prod,max,L}$, instead of being carried out based on minimum anticipated powers, modulated upwards and downwards.

Figure 20:
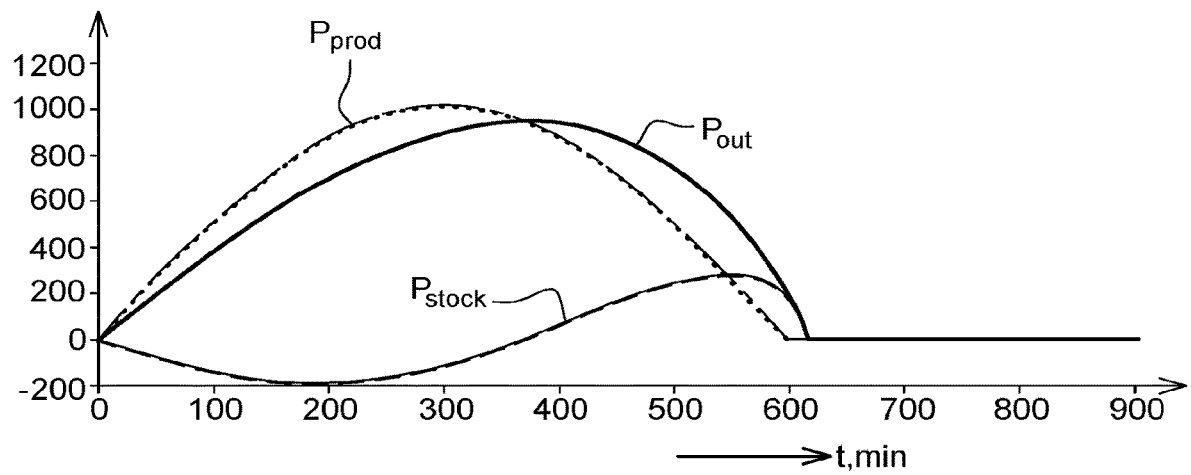
FIG. 20 diagrammatically shows results of a simulation of driving an electricity production assembly, carried out in accordance with the method of the FIG. 4, during a sunny day, without any passing of clouds.
Figure 21:
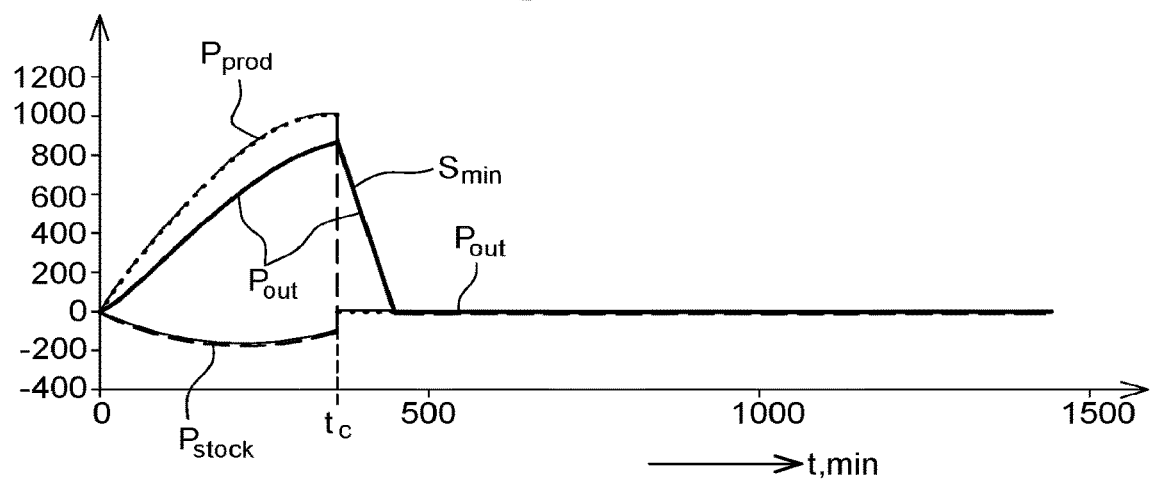
FIG. 21 diagrammatically shows results of a simulation of driving of the electricity production assembly, for other meteorological conditions.
Figure 22:
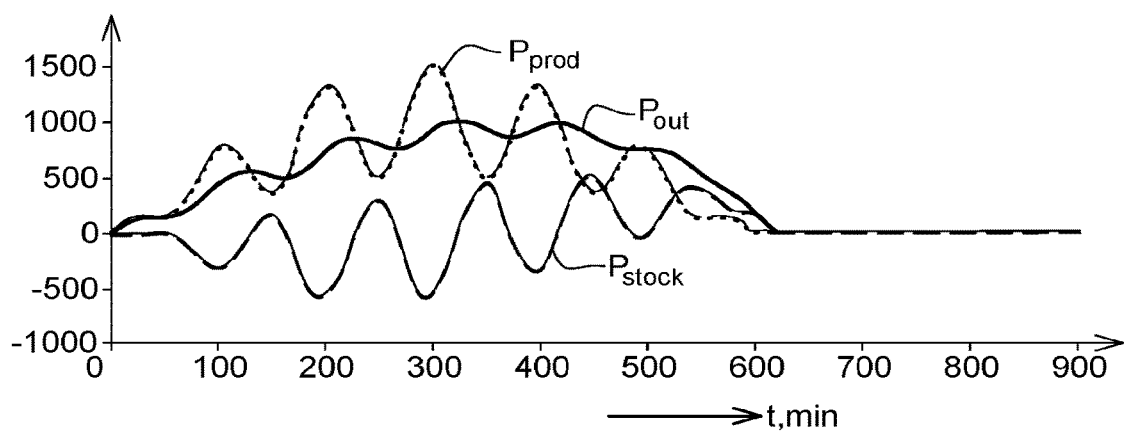
FIG. 22 diagrammatically shows results of a simulation of driving the electricity production assembly, for even other meteorological conditions.

FIGS. 20 to 22 show results of simulations of driving an electricity production assembly, carried out in accordance with the method that has just been described, in a case where the production system cannot be driven (not modulable).

Each one of these figures shows, according to the time t expressed in minutes:
  the output power Pprod, delivered by the production assembly 1,
  the storage power $P_{stock}$ supplied by the storage system 2 (negative in the case of a charge, and positive when the storage system delivers), and
  the delivered power $P_{out}$, finally supplied to the electricity distribution network.

Each one of these simulations extends over the entire duration of about a half-day (and during the day).

FIG. 20 corresponds to a sunny day, without any passing of clouds, during which the output power $P_{prod}$ (generated by the photovoltaic panels) varies progressively, by increasing, until the middle of the day, then by decreasing.

FIG. 21 corresponds to a sunny day, but during which the sky is covered with clouds, suddenly and sustainable (starting from an instant $t_C$).

FIG. 22 corresponds to a sunny day, but with several temporary passages of clouds that partially mask the sunlight, which causes a variation in the output power $P_{prod}$ that has the form of a wave (of which the period is about one hour and a half) which is superposed on the progressive variation, daily, of the output power.

As can be seen in FIGS. 21 and 22, the method for driving that is implemented here effectively makes it possible to regulate and to effectively smooth the fluctuations of the output power Prod, including over the long term (over a duration of several hours), and even in case of a meteorological disturbance that is both sudden and sustainable (case of FIG. 21).

In the case of FIG. 21, the output power $P_{prod}$ drops completely, and becomes zero starting from the instant $t_C$. But, before this date, the production assembly 10 was driven, in accordance with the method described hereinabove, in such a way as to deliver a power $P_{out}$ less than what could have been delivered in view of the output power $P_{prod}$, slightly moderated downwards, indeed in such a way as to be able to decrease to a zero power with a moderate slope, in case of a drop in the output power. Thanks to this arrangement, which constitutes a sort of precaution in the driving of the production assembly, the delivered power $P_{out}$ changes effectively with a rate of change that remains moderate, even when a sudden and sustainable meteorological disturbance occurs, as in the case of FIG. 21.

It is moreover observed on the example of FIG. 22 that this method of driving also makes it possible to effectively attenuate temporary variations, that have a typical duration of about an hour, of large amplitude (amplitude in variation of almost 100%). Here again, this very effective smoothing can be explained in particular by the fact that, in this method, account is taken of the strongest meteorological variations that are assumed to be able to occur (in other words, the fact that such variation can arise is anticipated).

And as can be seen in FIG. 20, driving as such the production assembly, taking account of the fact that the meteorological variations can be degraded, in fact does not reduce the driving performance in a favourable situation without a meteorological disturbance such as that of FIG. 20 (this simply offsets the instant for which $P_{out}$ is maximal, with respect to the instant for which $P_{prod}$ is maximal), which shows that using this method of driving is really particularly interesting in practice.

Note that, in the method of driving that was described hereinabove, an envelope is determined from which to choose the target power $P_C$ at which to control the production assembly (envelope that is delimited by the minimum and maximum admissible powers $P_L$ and $P_H$). But a certain latitude for adjustment exists, within this envelope, and it can be provided, in certain operating phases, to adjust the target power $P_C$, between the two limits $P_L$ and $P_H$, more or less strongly favouring the storage of energy, in relation to injecting electricity on the distribution network. Thus, by way of example, at the beginning of the day, during a certain duration starting from the moment when the sun rises (moment which approximately corresponds to t=0, in FIGS. 20 to 22), this arbitrage between storage and injection can be carried out in such a way as to maximise storage (for this, the target power $P_C$ is chosen rather low, in the interval of admissible powers that extends from $P_L$ to $P_H$), so as to recharge the electric batteries (substantially discharged during the night) in order to then have a reserve of energy useful for the smoothing of the electrical delivered power.

Different alternatives can be brought to the method that has just been described, in addition to those already mentioned hereinabove. For example, instead of determining the maximum admissible power, and the minimum admissible power, it is possible to only determine the maximum admissible power (or inversely), the target power, to be delivered at the following time-step, being chosen less than the maximum admissible power (respectively, greater than the minimum admissible power).

Moreover, the simulation carried out during the step of validating could be carried out more simply, by considering that the maximum charge and discharge powers have fixed values.

The operations carried out during the different steps presented hereinabove could be organised (grouped together) into steps in a way that is different from what was presented hereinabove.

Also note that the method for driving that has just been described can be used not only to drive an actual electricity production assembly, material, but also to drive a simulated electricity production assembly, in the framework of a method for sizing a production assembly. Indeed, the choice of the storage capacity to be installed in such an assembly is important in practice, and has substantial material and ecological consequences. As already indicated, an oversized storage system (excessive total storage capacity) represents unnecessary expense and a high ecological impact. But an undersized storage system will not allow for sufficient smoothing of the power delivered by the production assembly. It is therefore possible to provide, in order to best determine the storage capacity to install, to simulate the operation of the production assembly over a substantial duration (for example one week, or one month), to verify that a given storage capacity is sufficient. And, during this simulation, the driving of the simulated production assembly (fictitious) will be carried out in accordance with the method of driving described hereinabove, which, as indicated hereinabove, allows for optimum driving, and with minimal solicitation of the storage system. Basing the method for sizing on this method of driving will therefore make it possible to estimate as close as possible the storage capacity to be installed (avoiding costly oversizing).

The invention claimed is:

1. A method for driving an electricity production assembly that delivers a delivered power to an electricity distribution network, the electricity production assembly comprising:
  a system for producing electricity that generates an output power that depends on surrounding meteorological conditions, for which it is estimated that the output power is at least equal to a minimum anticipated power even in case of a downward fluctuation due to variations in metrological conditions, and
  a system for storing electrical energy, wherein an available, stored energy is stored, the method comprising the following steps, executed again at each time-step by a device for driving that comprises at least a processor and a memory:
  determining a maximum admissible power for the next time-step, and wherein the maximum admissible power is determined by seeking, in said interval, the largest electrical power that satisfies said criterion.

2. The method according to claim 1, further comprising an acquisition of a required power, to be supplied to the electricity distribution network, and wherein the target power is determined to be as close as possible to the required power, while still being less than or equal to said maximum admissible power.

3. The method according to claim 1, wherein:

it is estimated that the output power by the production system is at most equal to a maximum anticipated power even in case of an upward fluctuation due to variations in metrological conditions, an electrical energy, that is still receivable and storable in the storage system in view of the stored energy already stored in the storage system and in view of its total storage capacity, is represented by an energy storage margin, the method further comprising a step of determining a minimum admissible power, during which it is tested whether the minimum admissible power satisfies the following additional criterion:
- o if the production assembly delivers said minimum admissible power at the next time-step, and if the output power by the production system becomes equal to said maximum anticipated power starting from the next time-step,
- o then, taking account of the storage margin of the storage system at the considered time-step, the production assembly is adapted to subsequently deliver a delivered power that, over time, progressively reaches said maximum anticipated power, while still varying with a slope that remains between the minimum authorised slope and the maximum authorised slope, the minimum admissible power being determined by seeking, in said interval of delivered powers that is considered for the production assembly at the next time-step, the smallest electrical power that satisfies said additional criterion, and wherein the target power is determined to be greater than said minimum admissible power.

4. The method according to claim 1, wherein, during the step of validating, said numerical simulation is carried out by taking account of a maximum discharge power that is capable of being supplied by the storage system during a discharge, and by taking account of a maximum charge power that is acceptable by the storage system during a charge, the maximum discharge power and the maximum charge power being determined by taking account of the stored energy in the storage system, based on an operating model of the storage system.

5. The method according to claim 1, during which the minimum anticipated power is determined as follows:

the minimum anticipated power is equal, at the considered time-step, to the output power, actually generated by the production system at the considered time-step, the minimum anticipated power then decreases linearly over time with a slope equal to a maximum downward variation slope, expected, on the average, for the production system, in case of a sudden fluctuation in the meteorological conditions, then, as soon as the minimum anticipated power reaches a low average power anticipation, the minimum anticipated power is equal to said low average power anticipation, the low average power anticipation being representative of the smallest expected output power, for average meteorological conditions that are the least favourable in terms of production.

6. The method according to claim 1, comprising a determining of a safety curve, the safety curve being constituted, in a simulation plane of which the X-axis is time and of which the Y-axis is an electrical power, by the portion of the curve representative of the minimum anticipated power for which the slope is, at each instant, between the minimum authorised slope and the maximum authorised slope, comprising a determining of a simulation path, the simulation path being the path that, in the simulation plane:
- o connects a point of departure, of which the coordinates are the next time- step and the maximum admissible power, to said safety curve,
- o has a slope between the minimum authorised slope and the maximum authorised slope,
- o and which, in the simulation plane, has the shortest length in view of the two preceding constraints, and wherein said criterion is tested by carrying out a numerical simulation of the change in the power delivered by the electricity production assembly, during which it is tested whether the production assembly is capable of reaching said safety curve by following said simulation path, in view of the stored energy, present in the storage system at the considered time-step.

7. The method according to claim 1, wherein:

the production system is adapted to be driven, the output power able to be adjusted, for given metrological conditions, between a power modulated downwards and a power modulated upwards, and wherein, during the step of driving the production assembly, the production system is driven so that the output power has the highest possible value, compatible with the fact that the power delivered by the production assembly has to reach said target power at the next time-step.

8. The method according to claim 1, wherein:

the production system is adapted to be driven, the output power able to be adjusted, for given metrological conditions, between a power modulated downwards and a power modulated upwards, and wherein during the step of validating, said criterion is tested by taking account of the modulation possibilities of the output power, generated by the production system.

9. A device for driving for an electricity production assembly, the electricity production assembly delivering a delivered power to an electricity distribution network, the electricity production assembly comprising:

a system for producing electricity that generates an output power that depends on surrounding meteorological conditions, for which it is estimated that the output power is at least equal to a minimum anticipated power even in case of a downward fluctuation due to variations in metrological conditions, and a system for storing electrical energy, wherein an available, stored energy is stored, the driving device comprising at least one processor, a memory, and a communication module with the production and storage systems, the driving device being programmed to drive the electricity production assembly by executing the following steps, executed again at each time-step:

determining a maximum admissible power for the next time-step, determining a target power for the production assembly, the target power being determined to be less than the maximum admissible power, driving the production assembly so that the delivered power at the next time-step is equal to the target power, the step of determining the maximum admissible power comprising a step of validating, during which it is tested whether the maximum admissible power satisfies the following criterion:

if the production assembly delivers said maximum admissible power at the next time-step, and if the output power, generated by the production system, becomes equal to said minimum anticipated power starting from the next time-step, then, in view of the stored energy in the storage system at the time-step considered, the production assembly is adapted to subsequently deliver a delivered power that, over time, progressively reaches said minimum anticipated power, while still varying with a slope that remains between a minimum authorised slope and a maximum authorised slope, the step of validating comprising a determination by numerical simulation of the power that would subsequently be delivered, over time, by the production assembly, said simulation comprising a determination of a storage power delivered by the storage system over time, the storage power being determined based on an electrical or energy behaviour model of the storage system, wherein the driving device is further programmed to drive the electricity production assembly by executing a step of determining an interval of delivered powers, that is considered for the production assembly at the next time-step, said interval extending from a minimum acceptable power to a maximum acceptable power, the slope between the minimum acceptable power, at the next time-step, and the delivered power, actually generated at the considered time-step, being equal to said minimum authorised slope, the slope between the maximum acceptable power, at the next time-step, and the delivered power, actually generated at the considered time-step, being equal to said maximum authorised slope, and wherein the maximum admissible power is determined by seeking, in said interval, the largest electrical power that satisfies said criterion.

10. An electricity production assembly, delivering a delivered power to an electricity distribution network, the electricity production assembly comprising:

a system for producing electricity that generates an output power that depends on surrounding meteorological conditions, for which it is estimated that the output power is at least equal to a minimum anticipated power even in case of a downward fluctuation due to variations in metrological conditions, and a system for storing electrical energy, wherein an available, stored energy is stored, the electricity production assembly further comprising the driving device of claim 9.

* * * * *

UNITED STATES PATENT AND TRADEMARK OFFICE
CERTIFICATE OF CORRECTION

PATENT NO. : 11,437,817 B2
APPLICATION NO. : 17/123718
DATED : September 6, 2022
INVENTOR(S) : Franck Al Shakarchi et al.

It is certified that error appears in the above-identified patent and that said Letters Patent is hereby corrected as shown below:

In the Claims

Claim 1 should read:
1. A method for driving an electricity production assembly that delivers a delivered power to an electricity distribution network, the electricity production assembly comprising:
 a system for producing electricity that generates an output power that depends on surrounding meteorological conditions, for which it is estimated that the output power is at least equal to a minimum anticipated power even in case of a downward fluctuation due to variations in metrological conditions, and
 a system for storing electrical energy, wherein an available, stored energy is stored,
the method comprising the following steps, executed again at each time-step by a device for driving that comprises at least a processor and a memory:
 determining a maximum admissible power for the next time-step,
 determining a target power for the production assembly, the target power being determined to be less than the maximum admissible power,
 driving the production assembly so that the delivered power at the next time-step is equal to the target power,
the step of determining the maximum admissible power comprising a step of validating, during which it is tested whether the maximum admissible power satisfies the following criterion:
 if the production assembly delivers said maximum admissible power at the next time-step, and if the output power generated by the production system becomes equal to said minimum anticipated power starting from the next time-step, then, in view of the stored energy in the storage system at the time-step considered, the production assembly is adapted to subsequently deliver a delivered power that, over time, progressively reaches said minimum anticipated power, while still varying with a slope that remains between a minimum authorised slope and a maximum authorised slope,
the step of validating comprising a determination by numerical simulation of the power that Signed and Sealed this
Eleventh Day of October, 2022

Katherine Kelly Vidal
*Director of the United States Patent and Trademark Office* would subsequently be delivered over time by the production assembly, said simulation comprising a determination of a storage power delivered by the storage system over time, the storage power being determined based on an electrical or energy behaviour model of the storage system, wherein the method further comprises a step of determining an interval of delivered powers, that is considered for the production assembly at the next time-step, said interval extending from a minimum acceptable power to a maximum acceptable power, the slope between the minimum acceptable power, at the next time-step, and the delivered power, actually generated at the considered time-step, being equal to said minimum authorised slope, the slope between the maximum acceptable power, at the next time-step, and the delivered power, actually generated at the considered time-step, being equal to said maximum authorised slope, and wherein the maximum admissible power is determined by seeking, in said interval, the largest electrical power that satisfies said criterion.